US012552925B2

(12) United States Patent
Sawada

(10) Patent No.: US 12,552,925 B2
(45) Date of Patent: Feb. 17, 2026

(54) INJECTION MOLDED ARTICLE AND SHOE

(71) Applicant: ASICS CORPORATION, Kobe (JP)

(72) Inventor: Daisuke Sawada, Kobe (JP)

(73) Assignee: ASICS CORPORATION, Kobe (JP)

( * ) Notice: Subject to any disclaimer, the term of this patent is extended or adjusted under 35 U.S.C. 154(b) by 834 days.

(21) Appl. No.: 17/904,585

(22) PCT Filed: Dec. 13, 2021

(86) PCT No.: PCT/JP2021/045774
§ 371 (c)(1),
(2) Date: Aug. 18, 2022

(87) PCT Pub. No.: WO2022/163170
PCT Pub. Date: Aug. 4, 2022

(65) Prior Publication Data
US 2023/0093459 A1    Mar. 23, 2023

(30) Foreign Application Priority Data
Jan. 28, 2021    (JP) .................. 2021-012358

(51) Int. Cl.
*C08L 53/02*    (2006.01)
(52) U.S. Cl.
CPC .......... *C08L 53/02* (2013.01); *C08L 2205/025* (2013.01)
(58) Field of Classification Search
CPC ............... C08L 53/02; C08L 2205/025
See application file for complete search history.

(56) References Cited

U.S. PATENT DOCUMENTS

| 7,485,682 B2 * | 2/2009 | Ajbani ............... C08L 53/005 525/99 |
| 2021/0045491 A1 | 2/2021 | Tateishi et al. |
| 2021/0214546 A1 | 7/2021 | Sawada |

FOREIGN PATENT DOCUMENTS

| CN | 111655063 A | 9/2020 |
| EP | 3 797 628 A1 | 3/2021 |
| EP | 3564310 B1 * | 2/2023 | ............. C08L 91/00 |
| JP | H10-259281 A | 9/1998 |
| JP | 2002-173574 A | 6/2002 |
| JP | 2004-083729 A | 3/2004 |
| JP | 2008-264242 A | 11/2008 |
| JP | 2013035887 A * | 2/2013 |
| JP | 5966110 B1 | 8/2016 |

OTHER PUBLICATIONS

English machine translation of JP 2004-083729 (Year: 2004).*
English machine translation of JP 2013-035887 (Year: 2013).*
(Continued)

*Primary Examiner* — Angela C Scott
(74) *Attorney, Agent, or Firm* — Studebaker Brackett PLLC

(57) ABSTRACT

Provided is an injection molded article composed of an elastomer composition including: a plurality of styrene-based thermoplastic elastomers that include a first styrene-based thermoplastic elastomer that is a block polymer having a mass average molecular weight of 300,000, and a second styrene-based thermoplastic elastomer that is a block polymer having a polyethylene block exhibiting crystallinity; and a plasticizer.

18 Claims, 6 Drawing Sheets

(56) References Cited

OTHER PUBLICATIONS

An Office Action mailed by the Chinese Patent Office on Apr. 18, 2024, which corresponds to Chinese Patent Application No. 202180028745.7 and is related to U.S. Appl. No. 17/904,585.
International Preliminary Report On Patentability (Chapter I) and Written Opinion issued in PCT/JP2021/045774; mailed Aug. 10, 2023.
An Office Action mailed by China National Intellectual Property Administration on Dec. 16, 2024, which corresponds to Chinese Patent Application No. 202180028745.7 and is related to U.S. Appl. No. 17/904,585; with English language translation.
The extended European search report issued by the European Patent Office on Aug. 9, 2023, which corresponds to European Patent Application No. 21923175.0-1014 and is related to U.S. Appl. No. 17/904,585.
International Search Report issued in PCT/JP2021/045774; mailed Feb. 22, 2022.
Office Action issued in JP 2022-519596; mailed by the Japanese Patent Office on May 13, 2022.
Translation of the International Preliminary Report on Patentability (Chapter I) issued in PCT/JP2021/045774; mailed Oct. 12, 2022.

\* cited by examiner

INJECTION MOLDED ARTICLE AND SHOE

CROSS-REFERENCE TO RELATED APPLICATION

This application claims priority to Japanese Patent Application No. 2021-012358, the disclosure of which is incorporated herein by reference in its entirety.

The present invention relates to an injection molded article and a shoe.

FIELD

Background

Sports products used for various sports competitions each are composed of various parts. For example, a shoe is generally composed of, in addition to main parts such as a sole and an upper, a reinforcement part composed of a hard resin composition, a cushioning part composed of a soft elastomer composition, or the like. As the elastomer composition used in forming the cushioning part, a composition including a plasticizer in addition to an elastomer is known. In general, the plasticity of the elastomer composition of this type is adjusted by adjusting the content of the plasticizer.

Regarding shoe parts composed of the elastomer composition, Patent Literature 1 below discloses that a cushioning part used for a shoe is composed of the elastomer composition. More specifically, Patent Literature 1 below discloses that the cushioning part having excellent transparency and abrasion resistance is formed of the elastomer composition including a styrene-based thermoplastic elastomer.

Meanwhile, parts formed of the elastomer composition used for shoe parts or the like may be produced by injection molding. In the injection molding, products are produced by injecting the elastomer composition in a heated and molten state into a cavity of a forming mold, the cavity having a shape corresponding to the shape of the product, followed by allowing the elastomer composition filled in the cavity to cool and set. The injection molded article thus obtained can be used to prepare products even having a complex shape only by being subjected to a simple secondary processing such as deburring. Since shoe parts generally have complex shapes, such an injection molding method is suitable as a method for producing the shoe parts.

CITATION LIST

Patent Literature

Patent Literature 1: JP 5966110 B

SUMMARY

Technical Problem

The object of the present invention is to provide an injection molded article composed of an elastomer composition having a good fluidity in the injection molding, and also an injection molded article that can precisely reflect the state of a molding surface of a forming mold. Further, the object of the present invention is to provide a shoe including a shoe part that can be easily produced.

Solution to Problem

The present invention provides an injection molded article composed of an elastomer composition including a plurality of styrene-based thermoplastic elastomers and a plasticizer, in which the plurality of styrene-based thermoplastic elastomers includes a first styrene-based thermoplastic elastomer and a second styrene-based thermoplastic elastomer, the first styrene-based thermoplastic elastomer has a mass average molecular weight of 300,000 or more, the first styrene-based thermoplastic elastomer is a block polymer that includes a soft segment and two hard segments with the soft segment aligned between the two hard segments, and the second styrene-based thermoplastic elastomer is a block polymer that includes a polyethylene block exhibiting crystallinity.

In order to solve the aforementioned problem, the present invention provides a shoe composed of a plurality of shoe parts, wherein at least one of the plurality of shoe parts is the injection molded article as aforementioned.

DESCRIPTION OF EMBODIMENTS

An injection molded article of the present invention can be preferably used as a part of a sports product. Hereinafter, the present invention will be described by way of embodiments by taking, for example, the case where the injection molded article is used as a shoe part. Further, hereinafter, the description will be given for an embodiment by taking, for example, the case where the shoe part is arranged in a midsole of a shoe.

There are cases where the injection molded article does not have a desired appearance because, when the injection molded article is produced using the elastomer composition, the surface of the injection molded article sometimes does not sufficiently reflect the state of the molding surface of the forming mold on the surface of the injection molded article. When, for example, the fluidity of the elastomer composition is not good, it is difficult to obtain the injection molded article precisely reflecting the shape of the molding surface. Thus, it is not for the conventional shoe including the injection molded article as a shoe part as described above to be fabricated with a part excellent in appearance. The same problem can be caused not only in the case where the injection molded article is used as a shoe part, but in other applications. Accordingly, the following examples are provided to illustrate particular embodiments of the invention and the present invention is not limited to the examples in any manner. For example, the technical scope of the present invention should not be interpreted as being limited to the examples of the injection molded article in terms of the intended use (i.e., a shoe part), and the specific shape, the quantity, the size, and the various characteristic values in the intended use.

Figure 1:
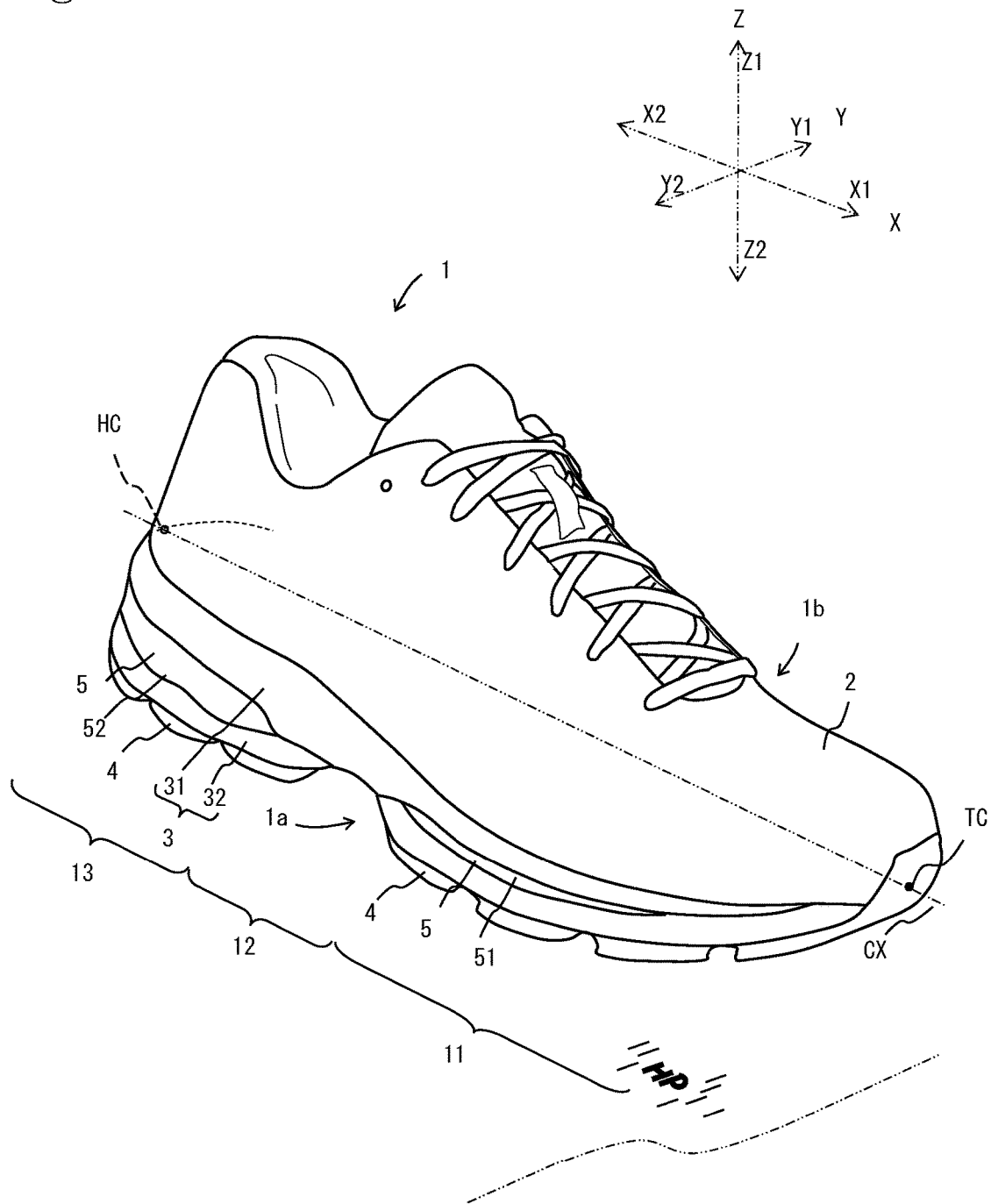
FIG. 1 is a schematic perspective view showing a shoe including a shoe part that is an injection molded article.

FIG. 1 shows a shoe formed using a shoe part of this embodiment. Hereinafter, when a description is given on the shoe shown in FIG. 1, a direction along a shoe center axis CX connecting a heel center HC and a toe center TC may be referred to as a length direction X. Among directions along the shoe center axis CX, a direction X1 directed from the heel to the toe may be referred to as, for example, a forward direction, and a direction X2 directed from the toe to the heel may be referred to as, for example, a rearward direction. Among directions orthogonal to the shoe center axis CX, a direction parallel to a horizontal plane HP may be referred to as a width direction Y. Regarding the width direction Y, a direction Y1 directed to the first toe side may be referred to as, for example, a medial side direction, and a direction Y2 directed to the fifth toe side may be referred to as, for example, a lateral side direction. A vertical direction Z orthogonal to the horizontal plane HP may be referred to as a thickness direction or a height direction. Further, hereinafter, a direction Z1 directed upward in this vertical direction Z may be referred to as an upward direction, and a direction Z2 directed downward may be referred to as a downward direction.

As shown in FIG. 1, the shoe 1 of this embodiment includes an upper 2 and a shoe sole. The shoe sole is composed of a plurality of shoe parts. The shoe 1 includes a midsole 3 and an outsole 4. The shoe 1 of this embodiment includes the outsole 4 in its bottommost position. The outsole 4 of this embodiment has, for example, a sheet shape, and is arranged in the bottommost position of the shoe 1 so that the thickness direction thereof corresponds to the vertical direction Z. The shoe 1 includes the midsole 3 between the outsole 4 and the upper 2 that covers a foot of a wearer from the upper side.

Figure 2:
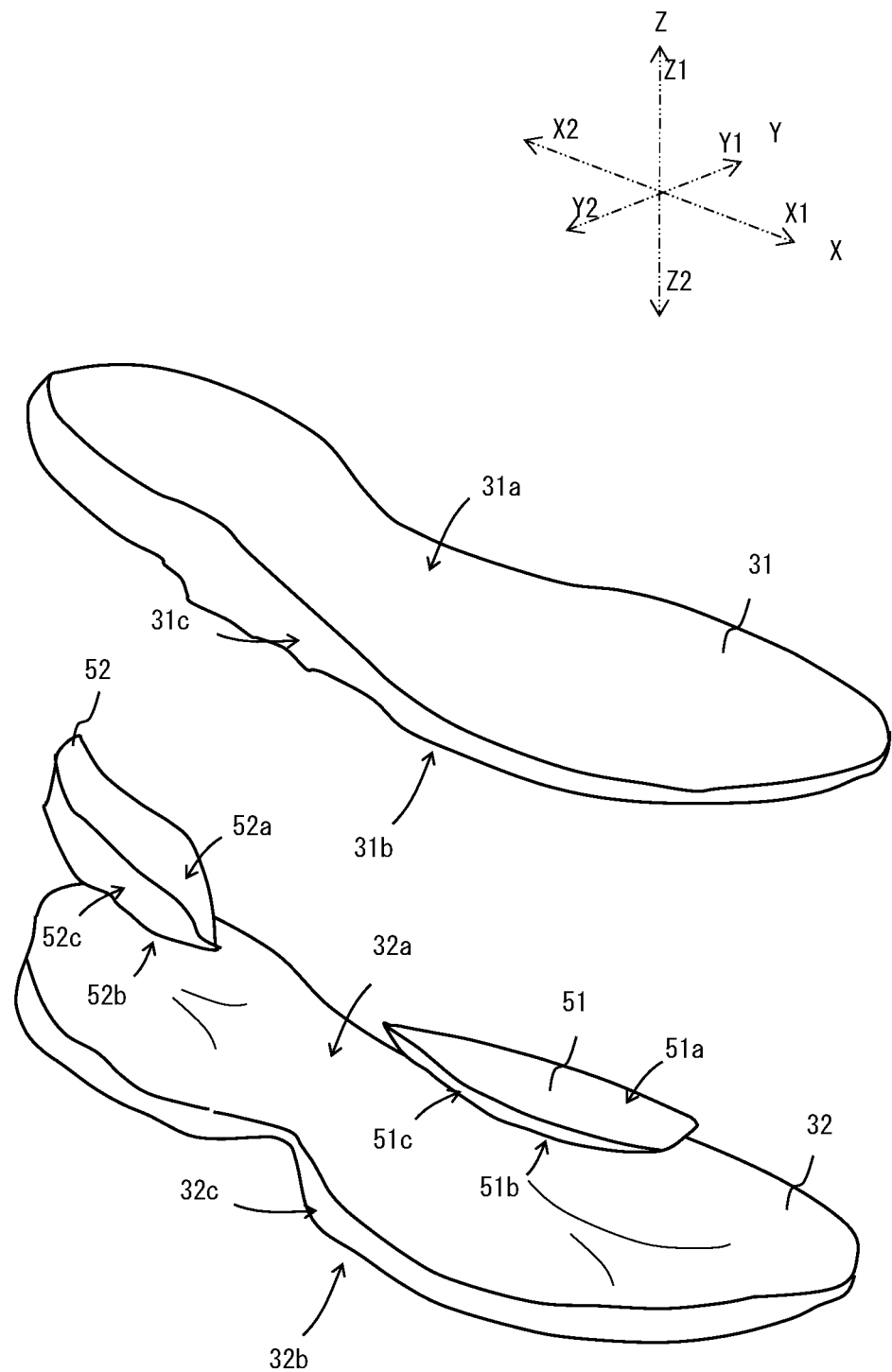
FIG. 2 is an exploded view of a shoe sole of the shoe shown in FIG. 1.

As shown in FIG. 2, the midsole 3 of this embodiment is, for example, separated into two upper and lower layers. Specifically, the shoe 1 of this embodiment includes a first midsole 31 that constitutes the upper layer of the two layers, and a second midsole 32 that constitutes the lower layer of the two layers. The outline shape of the first midsole 31 as viewed in the vertical direction corresponds to the outline shape of the second midsole 32, and they are vertically layered to have outer peripheral edges conforming to each other. The first midsole 31 has an upper surface 31a that is in contact with the upper 2 from below, and a lower surface 31b that is in contact with an upper surface of the second midsole 32. The second midsole 32 has a lower surface 32b that is in contact with the outsole 4 from above.

The shoe 1 of this embodiment includes, as shoe parts, two cushioning parts 5 sandwiched between the first midsole 31 and the second midsole 32. Each of the two cushioning parts 5 of this embodiment is an injection molded article, and as described later, is composed of an elastomer composition including a plurality of styrene-based thermoplastic elastomers and a plasticizer.

The size of each of the cushioning parts 5 as viewed in the vertical direction is smaller than the first midsole 31 and the second midsole 32. Accordingly, certain parts of the lower surface 31b of the first midsole 31 adhere to the cushioning parts 5 and the remaining part of the lower surface 31 adheres to the upper surface 32a of the second midsole 32.

One of the two cushioning parts 5 (hereinafter also referred to as "first cushioning part 51") is sandwiched between the first midsole 31 and the second midsole 32 in a forefoot portion 11 of the shoe. The other one of the two cushioning parts 5 (hereinafter also referred to as "second cushioning part 52") is sandwiched between the first midsole 31 and the second midsole 32 in a rear foot portion 13 of the shoe. In a midfoot portion 12 of the shoe 1, the cushioning part 5 is not sandwiched between the first midsole 31 and the second midsole 32.

Each of the first cushioning part 51 and the second cushioning part 52 is arranged on the shoe sole to be partly exposed to the outside, and arranged to constitute a part of an outer peripheral surface of the shoe sole. The first cushioning part 51 has a side surface 51c constituting a part of the outer peripheral surface, an upper surface 51a spreading inward (in the direction Y1) from an upper edge of the side surface 51c, and a lower surface 51b spreading inward (in the direction Y1) from a lower edge of the side surface 51c. That is, the first cushioning part 51 has the upper surface 51a that is in contact with the lower surface 31b of the first midsole 31 from below, and the lower surface 51b that is in contact with the upper surface 32a of the second midsole 32 from above. In the same manner as the first cushioning part 51, the second cushioning part 52 has a side surface 52c constituting the outer peripheral surface, an upper surface 52a spreading inward (in the direction Y1) from an upper edge of the side surface 52c, and a lower surface 52b spreading inward (in the direction Y1) from a lower edge of the side surface 52c. That is, the second cushioning part 52 has the upper surface 52a that is in contact with the lower surface 31b of the first midsole 31 from below, and the lower surface 52b that is in contact with the upper surface 32a of the second midsole 32 from above.

As shown in FIG. 2, each of the first cushioning part 51 and the second cushioning part 52 has such a shape as to increase the thickness as it advances in the direction Y2 from the medial side to the lateral side. In other words, each of the first cushioning part 51 and the second cushioning part 52 has such a shape as to increase the thickness as it advances from the center of the shoe sole toward the outer peripheral surface, while decreasing the thickness as it advances from a lateral side surface 1a of the shoe 1 toward the center of the shoe 1. Each of the first cushioning part 51 and the second cushioning part 52 of this embodiment is configured not to cross the shoe 1 in the width direction and not to be observed from a medial side surface 1b of the shoe 1.

The first cushioning part 51 and the second cushioning part 52 of this embodiment are formed of an elastomer composition having excellent transparency. The same elastomer composition is used for the cushioning part 51 and the second cushioning part 52 in this embodiment, although there is no need that the elastomer composition for constituting the first cushioning part 51 must be the same as the elastomer composition for constituting the second cushioning part 52.

Each of the first cushioning part 51 and the second cushioning part 52 of this embodiment has a smooth surface and thus hardly causes irregular reflection of light on the surface. Each of the first cushioning part 51 and the second cushioning part 52 is an injection molded article produced by using a forming mold having a smooth molding surface without being subjected to hairline treatment or mat treatment as described later, so that the surface of the produced injection molded article reflects the smooth characteristics of the molding surface.

It is possible to see deep inside the first cushioning part 51 because the elastomer composition included as a constituent has transparency and a smooth surface. That is, the first cushioning part 51 in the shoe 1 of this embodiment is arranged to make it possible to see the inside of the first cushioning part 51 from the lateral side toward the medial side through the side surface 51c, thereby enabling a sense of depth to be perceived. The first cushioning part 51 has not only the smooth side surface 51c enabling easy visual observation of its inside, but also the smooth upper surface 51a and the smooth lower surface 51b, which also enable easy visual observation of the state of the lower surface 31b of the first midsole 31 and the state of the upper surface 32a of the second midsole 32 through the side surface 51c. The same applies to the second cushioning part 52 in terms of the aforementioned characteristics.

As seen from the above, according to the shoe 1 of this embodiment, in the case where the lower surface 31b of the first midsole 31 is imparted with a color tone or pattern different from those of the side surface 31c, or the upper surface 32a of the first midsole 31 is imparted with a color tone or pattern different from those of the side surface 32c, those color tones or patterns are allowed to be visible from the outside through the first cushioning part 51 and the second cushioning part 52.

The elastomer composition is not necessarily colorless and transparent, and may be colored transparent or opaque. The elastomer composition preferably has transparency in terms of exhibiting the aforementioned characteristics. The transparency of the elastomer composition can be checked using, for example, a plate-shaped sample having a thickness of 4 mm prepared to have a sufficient smooth surface. The total light transmittance of the plate-shaped sample is preferably 60% or more. The total light transmittance of the plate-shaped sample is more preferably 70% or more, still more preferably 75% or more, particularly preferably 80% or more.

The haze of the plate-shaped sample (having a thickness of 4 mm) produced using the elastomer can be, for example, 40% or less. The haze of the plate-shaped sample (having a thickness of 4 mm) produced using the elastomer is preferably 30% or less. The haze of the plate-shaped sample is more preferably 20% or less, still more preferably 15% or less, particularly preferably 10% or less.

The total light transmittance can be measured by, for example, a method according to JIS K7361-1 "Plastics-Determination of the total luminous transmittance of transparent materials". The haze can be measured by, for example, a method according to JIS K-7136 "Plastics-Determination of haze for transparent materials". More specifically, the total light transmittance and the haze can be measured by an instrument such as a turbidimeter (for example, product name "NDH2000" manufactured by Nippon Denshoku Industries Co., Ltd.).

The first cushioning part 51 and the second cushioning part 52 preferably exhibit excellent cushioning performance. The Asker C hardness (at 23° C.) of the elastomer composition can be, for example, 60 or less, or 50 or less. Thus, the Asker C hardness (instantaneous value at 23° C.) of the elastomer composition is preferably 40 or less, more preferably 35 or less, still more preferably 30 or less. The Asker C hardness of the elastomer composition can be measured using an Asker C hardness meter according to JIS K7312.

The first cushioning part 51 and the second cushioning part 52 preferably exhibit excellent strength. The tensile strength of the elastomer composition is preferably 0.5 MPa or more, more preferably 1 MPa or more, still more preferably 1.5 MPa or more, particularly preferably 2.0 MPa or more. The tensile strength of the elastomer is especially preferably 2.5 MPa or more. In general, the tensile strength of the elastomer composition is 5 MPa or less. The tensile strength of the elastomer composition can be obtained according to JIS K6251 "Rubber, vulcanized or thermoplastics-Determination of tensile stress-strain properties" and measured using, for example, a No. 2 dumbbell-type specimen stipulated in this standard.

The tear strength of the elastomer composition is preferably 3 N/mm or more, more preferably 4 N/mm or more. The tear strength of the elastomer composition is still more preferably 8 N/mm or more, particularly preferably 10 N/mm or more. The tear strength of the elastomer composition is especially preferably 12 N/mm or more. In general, the tear strength of the elastomer composition is 20 N/mm or less. The tear strength of the elastomer composition can be obtained according to JIS K6251-1 "Rubber, vulcanized or thermoplastic-Determination of tear strength-Part 1: Trouser, angle and crescent test pieces" and measured using, for example, an angle test piece (no cutout) stipulated in this standard.

The elastomer composition that exhibits the aforementioned characteristics preferably has a complex viscosity of 10000 Pa·s or less obtained by dynamic viscoelasticity measurement at a temperature of 200° C. or less, and a loss tangent of 0.4 or more. In general, the temperature at which the elastomer composition has the aforementioned complex viscosity is 100° C. or more. That is, the elastomer composition of this embodiment satisfies both of (A) and (B) below at any temperature from 100° C. to 200° C. when a complex viscosity and a loss tangent are measured with a frequency changed from 1 Hz to 50 Hz while making a temperature constant, and the maximum value of the complex viscosity ($\eta_{max}$) and the maximum value of the loss tangent (tan $\delta_{max}$) at each of the respective temperatures from 100° C. to 200° C. are measured.

$$\eta_{max} \leq 10000 \text{ Pa·s} \quad (A)$$

$$\tan \delta_{max} \geq 0.4 \quad (B)$$

The right-hand side of inequality (A) above can be 5000 Pa·s, 4000 Pa·s, or 3000 Pa·s. The right-hand side of inequality (B) above can be 0.6 or 0.8, and is preferably 1.0. That is, the temperature at which the elastomer composition has a complex viscosity of 10000 Pa·s or less and a loss tangent of 1 or more is preferably 200° C. or less. The right-hand side of inequality (B) above can be 1.2, 1.5, or 2.

The temperature ($T_x$: ° C.) satisfying the conditions of both (A) and (B) above can be 100° C. or more, 110° C. or more, or 120° C. or more. The temperature ($T_x$: ° C.) satisfying the conditions of both (A) and (B) above can be 190° C. or less, or 180° C. or less.

In the temperature ($T_x$) satisfying the conditions of both (A) and (B) above, the difference ($\Delta T = T_{max} - T_{min}$) between the minimum temperature ($T_{min}$: ° C.) satisfying the conditions of both (A) and (B) above and the maximum temperature ($T_{max}$: ° C.) satisfying the conditions of both (A) and (B) above is preferably 10° C. or more, more preferably 20° C. or more, still more preferably 30° C. or more. The difference of the temperature ($\Delta T$) can be 40° C. or more, or 50° C. or more.

In the injection molding, the lower the complex viscosity is, the easier the elastomer composition spreads into every corner of the cavity.

The maximum value ($\eta_{max}$) of the complex viscosity of the elastomer composition in the frequency range of from 1 Hz to 50 Hz is preferably 10000 Pa·s or less as described above. The maximum value ($\eta_{max}$) of the complex viscosity in the frequency range of from 1 Hz to 50 Hz is more preferably 5000 Pa·s or less, still more preferably 4000 Pa·s or less, particularly preferably 3000 Pa·s or less.

The elastomer composition of this embodiment includes a plasticizer. In order to suppress bleeding out of the plasticizer from the first cushioning part 51 and the second cushioning part 52, the elastomer composition of this embodiment includes an elastomer having a large mass average molecular weight. Accordingly, it is difficult to make the complex viscosity of the elastomer composition excessively small. Also in order to prevent entrainment of air bubbles during the injection molding, the elastomer composition preferably has a complex viscosity equal to or higher than a certain value. The maximum value ($\eta_{max}$) of the complex viscosity of the elastomer composition is preferably 5 Pa·s or more, more preferably 10 Pa·s or more.

It is preferable that the complex viscosity at a temperature (Tx) satisfying the conditions of both (A) and (B) above do not greatly vary in the frequency range of from 1 Hz to 50 Hz. The complex viscosity of the elastomer composition is preferably such that the ratio ($\eta_{max}/\eta_{min}$) between the maximum value ($\eta_{max}$) and the minimum value ($\eta_{min}$) in the frequency range of from 1 Hz to 50 Hz be 10 or less. The ratio ($\eta_{max}/\eta_{min}$) is more preferably 8 or less, still more preferably 6 or less.

The elastomer composition of this embodiment preferably satisfies all of inequalities (A), (B), and (C) below at any temperature from 100° C. to 200° C.

$$\eta_{max} \leq 10000 \text{ Pa·s} \quad (A)$$

$$\tan \delta_{max} \geq 0.4 \quad (B)$$

$$(\eta_{max}/\eta_{min}) \leq 10 \quad (C)$$

As described above, it is preferable that a loss tangent obtained by dynamic viscoelasticity measurement at a temperature of 200° C. or less of the elastomer composition show a certain value. The loss tangent is a characteristic value that is also referred to as "tan δ" and obtained by calculating the ratio (G"/G') of a loss elastic modulus (G") to a storage elastic modulus (G').

The higher the loss tangent is, the more likely the elastomer composition exhibits liquid characteristics in the injection molding. That is, the higher the loss tangent is, the more the elastomer composition can smoothly move along the molding surface of the forming mold in the injection molding. Thus, the effect of suppressing fine wrinkles formed on the surface of the injection molded article can be enhanced.

In this embodiment, it is possible to obtain an injection molded article having a smooth surface without a special treatment, for example, a smoothing treatment on a surface that maintains the same surface conditions as those when it was in contact with the molding surface of the forming mold. In this embodiment, the surface of the injection molded article immediately after the injection molding can have, for example, an arithmetic mean roughness (Ra) of 12 μm or less. The arithmetic mean roughness (Ra) of the surface of the injection molded article is preferably 10 μm or less, more preferably 8 μm or less. The arithmetic mean roughness (Ra) of the surface of the injection molded article can be determined by the non-contact method based on ISO-25178. Specifically, the arithmetic mean roughness (Ra) of the surface of the injection molded article can be determined by the method described in Examples. In this embodiment, the surface of the injection molded article is enough smooth even if the surface maintains the same surface conditions as those when it was in contact with the molding surface of the forming mold. Therefore, in this embodiment, there is less need to additionally subject the once-produced injection molded article to the surface-smoothing treatment, and thus the first cushioning part 51 and the second cushioning part 52 can be easily produced.

As described above, the maximum value of the loss tangent (tan $\delta_{max}$) of the elastomer composition in the frequency range of from 1 Hz to 50 Hz can be 0.6 or more, or 0.8 or more, and is preferably 1 or more. The maximum value of the loss tangent (tan $\delta_{max}$) is more preferably 1.2 or more, still more preferably 1.5 or more, particularly preferably 2 or more. In general, the maximum value of the loss tangent (tan $\delta_{max}$) of the elastomer composition is 1,000 or less.

The range in which the value of the loss tangent exceeds the maximum value extends preferably over 10% or more of the frequency range of from 1 Hz to 50 Hz. That is, the value of the loss tangent is preferably such that the loss tangent exceeds the maximum value over a 5 Hz or more range in the frequency range of from 1 Hz to 50 Hz. The range in which the value of the loss tangent exceeds the maximum value extends more preferably over 5% or more of the frequency range of from 1 Hz to 50 Hz, still more preferably over 50% or more of the frequency range of from 1 Hz to 50 Hz. The loss tangent exceeds the maximum value particularly preferably throughout the frequency range of from 1 Hz to 50 Hz.

It is preferable that the value of the loss tangent at a temperature (Tx) satisfying the conditions of both (A) and (B) above do not greatly vary in the frequency range of from 1 Hz to 50 Hz. The value of the loss tangent of the elastomer composition is preferably such that the ratio ($R_{max}/R_{min}$) between the maximum value ($R_{max}$) and the minimum value ($R_{min}$) in the frequency range of from 1 Hz to 50 Hz be preferably 10 or less. The ratio ($R_{max}/R_{min}$) is more preferably 8 or less, still more preferably 6 or less.

The elastomer composition of this embodiment preferably satisfies all of inequalities (A), (B), and (D) below at any temperature from 100° C. to 200° C.

$$\eta_{max} \leq 10000 \text{ Pa·s} \quad (A)$$

$$\tan \delta_{max} \geq 0.4 \quad (B)$$

$$(R_{max}/R_{min}) \leq 10 \quad (D)$$

The elastomer composition of this embodiment preferably satisfies all of inequalities (A), (B), (C), and (D) below at any temperature from 100° C. to 200° C.

$$\eta_{max} \leq 10000 \text{ Pa·s} \quad (A)$$

$$\tan \delta_{max} \geq 0.4 \quad (B)$$

$$(\eta_{max}/\eta_{min}) \leq 10 \quad (C)$$

$$(R_{max}/R_{min}) \leq 10 \quad (D)$$

The complex viscosity and the loss tangent of the elastomer composition can be obtained based on JIS K 7244-6 "Plastics—Determination of dynamic mechanical properties—Part 6: Shear vibration—Non-resonance method". Specifically, the measurement can be made using a dynamic viscoelasticity measuring instrument (product name "MCR-302" manufactured by Anton Paar GmbH). Measurement can be made with a parallel plate-shaped sample having a diameter of 25 mm under the following measurement conditions.

<Measurement Conditions>
Measurement mode: Shear mode of a sinusoidal strain
Frequency: from 1 Hz to 50 Hz
Load: Automatic static load
Dynamic strain: 10%
Measurement temperature: Constant conditions in every measurement The elastomer composition of this embodiment preferably has temperature characteristics to show a peak value between 100° C. and 200° C. when a graph is drawn with a horizontal axis as the temperature and a vertical axis as "tan $\delta_{max}$". That is, when the value of "tan $\delta_{max}$" is measured at each of the respective temperatures between 100° C. and 200° C., the elastomer composition preferably has a value of "tan $\delta_{max}$" that decreases from the temperature showing the peak value toward the lower temperature side, and also decreases from the temperature showing the peak value toward the higher temperature side. The temperature showing the peak value is preferably 120° C. or more and 180° C. or less, more preferably 130° C. or more and 170° C. or less.

The elastomer composition of this embodiment includes a plurality of styrene-based thermoplastic elastomers and a plasticizer. That is, the elastomer composition includes two or more styrene-based thermoplastic elastomers. The elastomer composition may include only a plasticizer, or may include two or more plasticizers.

One of the plurality of styrene-based thermoplastic elastomers (hereinafter, also referred to as "first styrene-based thermoplastic elastomer") included in the elastomer composition is preferably a block polymer including a soft segment and hard segments at both terminals of the soft segment in a molecular structure. That is, the first styrene-based thermoplastic elastomer preferably has a triblock structure including a soft segment composed of a polyolefin block or the like and a hard segment composed of a polystyrene block or the like, in which the hard segment, the soft segment, and the hard segment are aligned in this order.

In the first styrene-based thermoplastic elastomer having such a triblock structure, high intermolecular forces are exerted between the hard segments of each adjacent molecules to form a pseudo-crosslinked structure that allows each soft segment present between the crosslinking points by the pseudo-crosslinked structure to retain the plasticizer. The elastomer composition of this embodiment includes a plurality of styrene-based thermoplastic elastomers as described above. That is, not only the first styrene-based thermoplastic elastomer, but also a second styrene-based thermoplastic elastomer and a third styrene-based thermoplastic elastomer can be further included in the plurality of styrene-based thermoplastic elastomers.

Examples of the first styrene-based thermoplastic elastomer, the second styrene-based thermoplastic elastomer, and the third styrene-based thermoplastic elastomer of this embodiment include: a random polymer such as hydrogenated rubber (HSBR) of styrene butadiene rubber (SBR); a block polymer having a diblock structure such as styrene-ethylene/butylene copolymer (SEB), or styrene-ethylene/propylene copolymer (SEP); and a block polymer having a triblock structure such as styrene-butadiene-styrene copolymer (SBS), styrene-isoprene-styrene copolymer (SIS), styrene-ethylene/butylene-styrene copolymer (SEBS), styrene-ethylene/butylene-ethylene copolymer (SEBC), styrene-ethylene/propylene-styrene copolymer (SEPS), styrene-ethylene/ethylene/propylene-styrene copolymer (SEEPS), or styrene-butadiene/butylene-styrene copolymer (SBBS).

As described above, the styrene-based thermoplastic elastomer having a triblock structure is suitable as the first styrene-based thermoplastic elastomer included in the elastomer composition of this embodiment. Among the styrene-based thermoplastic elastomers having a triblock structure, a block polymer having a mass average molecular weight of 300,000 or more is suitable as the first styrene-based thermoplastic elastomer included in the elastomer composition since the block polymer is appropriate to allow the elastomer composition to exhibit the melting characteristics suitable for the injection molding. Since the first styrene-based thermoplastic elastomer has a high-molecular weight, it has a soft segment having a long chain length and is excellent in the ability of retaining the plasticizer. Inclusion of the first styrene-based thermoplastic elastomer as aforementioned makes it possible to reduce a likelihood of causing bleeding out of the plasticizer from the first cushioning part 51 and the second cushioning part 52. Accordingly, inclusion of the first styrene-based thermoplastic elastomer in the elastomer composition makes it possible to widen the range of selection of the type, the content, or the like of the plasticizer for the elastomer composition.

The first styrene-based thermoplastic elastomer having a triblock structure may be a tetrablock polymer having a structure in an alternating hard-soft-hard-soft configuration or a multiblock polymer having five or more of blocks in total with alternating hard segments and soft segments; however, is preferably a triblock polymer having a molecule chain, both terminals of which are hard segments, with only one soft segment sandwiched between the hard segments.

In order to make it easy to produce the first cushioning part 51 and the second cushioning part 52, it is preferable that the second styrene-based thermoplastic elastomer (TPS2) and the third styrene-based thermoplastic elastomer (TPS3) in addition to the first styrene-based thermoplastic elastomer be included in the elastomer composition.

The second styrene-based thermoplastic elastomer (TPS2) of this embodiment include a polyethylene block exhibiting crystallinity. In general, the crystalized polyethylene has a higher elastic modulus than an amorphous polyethylene. Thus, it is preferable that the elastomer composition include polyethylene in a crystalline state rather than in an amorphous state in order to cause the elastomer composition to exhibit an excellent strength.

A conventional styrene-based thermoplastic elastomer exhibits fluidity at a temperature of 140° C. to 180° C. when it is heated. The crystals of polyethylene have a melting point lower than the aforementioned temperature. Accordingly, the crystals of polyethylene exhibiting fluidity at an early stage can be expected to function like a lubricant when the styrene-based thermoplastic elastomer is heated. Therefore, it is preferable that the second styrene-based thermoplastic elastomer include an appropriate proportion of the crystals of polyethylene.

It is preferable that the second styrene-based thermoplastic elastomer include 4 mass % or more of the crystals of polyethylene. The content of the crystals of polyethylene in the second styrene-based thermoplastic elastomer can be 5 mass % or more, or 6 mass % or more. The content of the crystals of polyethylene in the second styrene-based thermoplastic elastomer is preferably 12 mass % or less. The content of the crystals of polyethylene in the second styrene-based thermoplastic elastomer can be 11 mass % or less, or 10 mass % or less.

In order to cause the elastomer composition to exhibit an excellent fluidity, it is preferable that 1 mass % or more of the second styrene-based thermoplastic elastomer be included in the elastomer composition. The content of the second styrene-based thermoplastic elastomer in the elastomer composition can be 2 mass % or more, or 3 mass % or more.

In order to cause the elastomer composition to exhibit a good transparency, the content of the second styrene-based thermoplastic elastomer in the elastomer composition is preferably 10 mass % or less. The content of the second styrene-based thermoplastic elastomer in the elastomer composition can be 8 mass % or less, or 6 mass % or less.

When the content of the first styrene-based thermoplastic elastomer (TPS1) in the elastomer composition is 100 mass parts, the content of the second styrene-based thermoplastic elastomer (TPS2) is preferably 25 mass parts or more. The content of the second styrene-based thermoplastic elastomer (TPS2) is preferably 250 mass parts or less. The content of the second styrene-based thermoplastic elastomer (TPS2) is more preferably 200 mass parts or less, still more preferably 150 mass parts or less, especially preferably 100 mass parts or less. The content of the second styrene-based thermoplastic elastomer (TPS2) can be 75 mass parts or less, or 50 mass parts or less. That is, the mass ratio (TPS1:TPS2) of the first styrene-based thermoplastic elastomer (TPS1) and the second styrene-based thermoplastic elastomer (TPS2) is preferably 100:25 to 100:250, more preferably 100:25 to 100:200. The mass ratio is still more preferably 100:25 to 100:150, especially preferably 100:25 to 100:100. The mass ratio can be 100:25 to 100:75, or 100:25 to 100:50.

It is preferable that the second styrene-based thermoplastic elastomer do not have polystyrene block on both sides of the polyethylene block in terms of causing the polyethylene block to easily exhibit its function. The second styrene-based thermoplastic elastomer preferably includes the polystyrene block only on one side of the polyethylene block. The second styrene-based thermoplastic elastomer can be a diblock polymer composed of the polyethylene block and the polystyrene block.

The second styrene-based thermoplastic elastomer (TPS2) is preferably styrene-ethylene/butylene-ethylene copolymer (SEBC). The styrene-ethylene/butylene-ethylene copolymer (SEBC) includes a polyethylene block exhibiting crystallinity. Whether the styrene-ethylene/butylene-ethylene copolymer (SEBC) includes the polyethylene block exhibiting crystallinity can be confirmed by a differential scanning calorimeter (DSC). According to the analysis using the DSC, it is also possible to confirm the amount of the crystals of polyethylene.

Whether the crystals of polyethylene are present in the second styrene-based thermoplastic elastomer can be confirmed by a DSC curve that shows an endothermic peak or a crystallization peak. The DSC curve can be obtained by, for example, heating the styrene-ethylene/butylene-ethylene copolymer (SEBC) at a heating rate of 10° C./min or cooling it at the same rate. The endothermic peak and the crystallization peak derived from the crystals of polyethylene can be observed in the DSC curve mostly between 70° C. and 160° C. A quantity of heat of crystal fusion of polyethylene is 293 J/g according to the literature value. Accordingly, how large polyethylene blocks exhibiting crystallinity are included can be confirmed by the endothermic quantity at the endothermic peak and the exothermic quantity at the crystallization peak in the DSC curve.

The crystalline polymer such as polyethylene exhibits crystallinity since, when it is heated to a temperature higher than the melting point, the enthalpy of melting allows the main chain of the polymer to freely perform molecular motion. In the amorphous polymer, the same phenomenon is found at the glass transition temperature. Thus, for example, when the amorphous polymer such as a styrene homopolymer (GPPS) is heated, endothermic reaction is found at the glass transition temperature. When the polystyrene block in the same state as the styrene homopolymer is included in the second styrene-based thermoplastic elastomer, the endothermic reaction at the glass transition temperature can also occur in the second styrene-based thermoplastic elastomer.

The occurrence of the endothermic reaction at the glass transition temperature means that a strong bonding force acts between polystyrene blocks. The second styrene-based thermoplastic elastomer having such polystyrene blocks can be expected to generate a strong bonding force between the first styrene-based thermoplastic elastomer and the second styrene-based thermoplastic elastomer.

The glass transition temperature of the styrene homopolymer (GPPS) is about 100° C., which is approximate to the melting point of polyethylene. Thus, when the polystyrene blocks in a state of showing the glass transition are included in the second styrene-based thermoplastic elastomer, the endothermic reaction by the crystal fusion of polyethylene and the endothermic reaction by the glass transition of polyethylene are united to be observable as one endothermic peak in the DSC curve. Accordingly, the content of the crystals of polyethylene in the second styrene-based thermoplastic elastomer can be calculated more precisely when using the exothermic quantity at the crystallization peak.

The second styrene-based thermoplastic elastomer in which the polystyrene blocks are included in a state of showing the glass transition is advantageous in terms of exerting a strong bonding force to the first styrene-based thermoplastic elastomer, as described above. Thus, it is preferable in this embodiment to use the second styrene-based thermoplastic elastomer, in which the endothermic quantity is observed as being a higher value when comparing between the endothermic quantity at the endothermic peak and the exothermic quantity at the crystallization peak, both peaks appearing at the vicinity of 100° C. in the DSC curve. The endothermic quantity of the second styrene-based thermoplastic elastomer can be 1.2 times or more as much as the exothermic quantity at the crystallization peak. The endothermic quantity can be 1.3 time or more, or 1.4 times or more as much as the exothermic quantity. In general, the endothermic quantity is 2.5 times or less as much as the exothermic quantity. The endothermic quantity can be 2.0 times or less, or 1.8 times or less as much as the exothermic quantity.

The endothermic quantity at the endothermic peak and the exothermic quantity at the crystallization peak in the second styrene-based thermoplastic elastomer can be measured by the DSC. In the measurement, the second styrene-based thermoplastic elastomer having a weight of, for example, about 5 mg is used as a sample. In the measurement, the sample is first measured to obtain an accurate weight, thereby determining the mass M (mg) of the sample. In the DSC measurement, first, a DSC curve for determining the endothermic quantity and the exothermic quantity is obtained. The sample is heated from ordinary temperature to a temperature of about 200° C. (first heating), thereafter cooled to ordinary temperature (first cooling), and heated again to a temperature of about 200° C. (second heating), to obtain the DSC curve. Both the heating rate and the cooling rate of the sample can be 10° C./min In this measurement, alumina having the same mass as that of the sample can be used as a reference. Also, in this embodiment, nitrogen can be used as a purge gas. The purge gas can be used at a flow rate of, for example, 20 ml/min.

The exothermic quantity at the crystallization peak can be determined by the exothermic peak observed when the sample is cooled (the first cooling). The endothermic quantity at a melting peak can be determined by the endothermic peak observed when the sample is heated twice (the second heating). Each of the heat quantities can be determined by the area of the region surrounded by the DSC curve and the line segment connecting the point at which the peak separates from the base line on the higher temperature side and the point at which the peak returns to the base line on the lower temperature side. The aforementioned line segment can be drawn to connect the points, at each of which the inclination of differential curve obtained from the measurement by the DSC is zero, with each other. For the DSC, a commercially available device (for example, product name "DSC 200 S3" manufactured by NETZSCH) can be used.

The exothermic quantity Qexo (mJ/mg) and the endothermic quantity Qendo (mJ/mg) in the second styrene-based thermoplastic elastomer can be the arithmetic mean value of the measured values obtained by performing measurements similar to the above described measurement multiple times (for example, 3 times).

The mass m (mg) of the crystals of polyethylene included in the sample can be calculated by the formula below using the exothermic quantity Qexo (mJ/mg) and the quantity of heat of crystal fusion of polyethylene (293 J/g) obtained by the measurements.

$$m = Qexo/293$$

The content X (mass %) of the crystals of polyethylene in the second styrene-based thermoplastic elastomer can be calculated by the formula below using the mass M (mg) of the sample and the mass m (mg) of the crystals of polyethylene.

$$X = (m/M) \times 100$$

The content X (mass %) of the crystals of polyethylene in the second styrene-based thermoplastic elastomer can be the arithmetic mean value of the measured values obtained by changing the sample and performing measurements multiple times (for example, 5 times) on the changed sample.

It is preferable that the styrene-ethylene/butylene-ethylene copolymer (SEBC) be excellent in fluidity when it is heat fused. The melt mass-flow rate (MFR) of the styrene-ethylene/butylene-ethylene copolymer (SEBC) is preferably 1 g/10 min or more. The melt mass-flow rate (MFR) of the styrene-ethylene/butylene-ethylene copolymer (SEBC) is more preferably 2 g/10 min or more, still more preferably 3 g/10 min or more. The melt mass-flow rate (MFR) of the styrene-ethylene/butylene-ethylene copolymer (SEBC) can be, for example, 30 g/10 min or less.

The melt mass-flow rate (MFR) of the styrene-based thermoplastic elastomer is measured based on the method described in JIS K7210-1 (Method A, 230° C., 2.16 kg).

The elastomer compositions, in which the styrene-based thermoplastic elastomer including the hard segments and the soft segment is included as the main component have different micro structures from each other at the molecular level depending on the styrene-based thermoplastic elastomer. In such elastomer compositions, a number of aggregates in which the hard segments aggregate are formed. It is conceivable that, in the styrene-based thermoplastic elastomer having a large molecular weight, each of the aggregates has a larger size than that of the styrene-based thermoplastic elastomer having a small molecular weight, which causes enlargement of gaps between the aggregates. In this embodiment, the enlargement of the gaps between the aggregates as described above suppresses the separation (i.e., the bleed-out) of the plasticizer.

When the elastomer composition is heated, the heat energy is converted into a kinematic energy of molecular of the styrene-based thermoplastic elastomer so that the molecules of the styrene-based thermoplastic elastomer can freely move to exhibit fluidity. Therefore, it is conceivable that the elastomer composition when including aggregates having a large size has a difficulty in exhibiting a good fluidity when it is heated.

For the reasons described above, the elastomer composition when including only the first styrene-based thermoplastic elastomer has a difficulty in exhibiting a good fluidity when it is heated, while causing less bleed-out of the plasticizer. The polyethylene block having crystallinity in the second styrene-based thermoplastic elastomer (TPS2 (SEBC)) appears to have a function to suppress the formation of aggregates of the hard segments. Further, the crystals of polyethylene block fuse at a temperature of around 100° C. The fused polyethylene block is unlikely to be steric hindrance during the movement of the molecules. For the above reasons, the elastomer composition of this embodiment includes the second styrene-based thermoplastic elastomer (SEBC) to thereby exhibit a good fluidity.

The elastomer composition of this embodiment further includes the third styrene-based thermoplastic elastomer (TPS3). The third styrene-based thermoplastic elastomer (TPS3) preferably has a mass average molecular weight of 200,000 or less. The second styrene-based thermoplastic elastomer (TPS2) also preferably has a mass average molecular weight of 200,000 or less. The mass average molecular weight of each of the second styrene-based thermoplastic elastomer (TPS2) and the third styrene-based thermoplastic elastomer (TPS3) can be 150,000 or less, or can be 120,000 or less. The third styrene-based thermoplastic elastomer (TPS3) preferably has a triblock structure.

The mass average molecular weight of the first styrene-based thermoplastic elastomer (TPS1) is more preferably 550,000 or less, still more preferably 500,000 or less, particularly preferably 450,000 or less. The mass average molecular weight of each of the second styrene-based thermoplastic elastomer (TPS2) and the third styrene-based thermoplastic elastomer (TPS3) is more preferably 30,000 or more, still more preferably 40,000 or more, particularly preferably 50,000 or more.

The mass average molecular weight of the styrene-based thermoplastic elastomer other than SEBC can be obtained as follows. The mass average molecular weight (Mw) can be obtained as a standard-polystyrene-equivalent molecular weight by gel permeation chromatography (GPC). The measurement instrument and conditions can be adopted as follows:

Instrument: GPC instrument "HLC-8320GPC" manufactured by Tosoh Corporation
Separation column: "TSKgel SuperHM-H" manufactured by Tosoh Corporation
Detector: "RI-8320" manufactured by Tosoh Corporation
Eluent: Tetrahydrofuran
Eluent flow rate: 0.6 mL/min
Sample concentration: 1 mg/mL
Column temperature: 40° C.

The mass average molecular weight of SEBC can be obtained as follows. The mass average molecular weight (Mw) can be obtained as a standard-polystyrene-equivalent molecular weight by gel permeation chromatography (GPC). The measurement instrument and conditions can be adopted as follows:

Instrument: GPC instrument "HLC-8321GPC/HT" manufactured by Tosoh Corporation
Separation column: "TSKgel GMHHRH(20)HT" manufactured by Tosoh Corporation
Detector: "RI-8320" manufactured by Tosoh Corporation
Eluent: 1,2,4-Trichlorobenzene+0.05% BHT
Eluent flow rate: 1.0 mL/min
Sample concentration: 1 mg/mL
Column temperature: 140° C.

The first styrene-based thermoplastic elastomer (TPS1) is preferably any one of styrene-ethylene/butylene-styrene copolymer (SEBS), styrene-ethylene/propylene-styrene copolymer (SEPS), and styrene-ethylene/ethylene/propylene-styrene copolymer (SEEPS).

The higher the styrene content of the first styrene-based thermoplastic elastomer (TPS1), the stronger the pseudo-crosslinked structure. Therefore, the styrene content of the first styrene-based thermoplastic elastomer (TPS1) is preferably 20 mass % or more, more preferably 25 mass % or more. Meanwhile, the fact that the styrene content is high indicates that the content of the soft segment effective to retain the plasticizer is small. Therefore, the styrene content of the first styrene-based thermoplastic elastomer (TPS1) is preferably 50 mass % or less, more preferably 40 mass % or less.

The third styrene-based thermoplastic elastomer (TPS3) is preferably any one of styrene-ethylene/butylene-styrene copolymer (SEBS), styrene-ethylene/propylene-styrene copolymer (SEPS), and styrene-ethylene/ethylene/propylene-styrene copolymer (SEEPS).

Each of the first styrene-based thermoplastic elastomer (TPS1) and the third styrene-based thermoplastic elastomer (TPS3) is preferably styrene-ethylene/ethylene/propylene-styrene copolymer (SEEPS).

The second styrene-based thermoplastic elastomer (TPS2) is preferably styrene-ethylene/butylene-ethylene copolymer (SEBC) as described above. The styrene content of the second styrene-based thermoplastic elastomer (TPS2) is preferably 10 mass % or more, more preferably 15 mass % or more. The styrene content of the second styrene-based thermoplastic elastomer (TPS2) is preferably 40 mass % or less, more preferably 35 mass % or less, still more preferably 30 mass % or less.

For the same reason as the first styrene-based thermoplastic elastomer (TPS1), the styrene content of the third styrene-based thermoplastic elastomer (TPS3) is preferably 20 mass % or more, more preferably 25 mass % or more. Also, the styrene content of the third styrene-based thermoplastic elastomer (TPS3) is preferably 50 mass % or less, more preferably 40 mass % or less.

The elastomer composition can include three or more styrene-based thermoplastic elastomers. Examples of the styrene-based thermoplastic elastomer include styrene-based thermoplastic elastomer (TPSx) having a styrene content of 60 mass % or more and 70 mass % or less, amine-modified styrene-based thermoplastic elastomer (TPSy), and maleic anhydride-modified styrene-based thermoplastic elastomer (TPSz). Each of the styrene-based thermoplastic elastomers (TPSx to TPSz) preferably has a mass average molecular weight of 30,000 or more and 200,000 or less.

The elastomer composition may include, in addition to the aforementioned styrene-based thermoplastic elastomers, a styrene-based resin such as polystyrene, an acrylonitrile styrene resin (AS resin), and an acrylonitrile butadiene styrene resin (ABS resin).

The elastomer composition may include: an olefin-based polymer such as an olefin-based elastomer or an olefin-based resin; an amide-based polymer such as an amide-based elastomer or an amide-based resin; an ester-based polymer such as an ester-based elastomer or an ester-based resin; or a urethane-based elastomer or a urethane-based resin.

Examples of the olefin-based polymer include polyethylene (for example, linear low-density polyethylene (LLDPE) and high density polyethylene (HDPE)), polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene copolymer, ethylene-methacrylate copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylate copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer (EVA), and propylene-vinyl acetate copolymer.

Among the olefin-based polymers, polypropylene effectively acts on the elastomer composition to exhibit high fluidity during the injection molding. Among polypropylenes, polypropylene (r-PP) which is a random copolymer of ethylene and propylene is particularly excellent in the aforementioned effect compared with polypropylene (h-PP) which is a homo polymer of propylene or polypropylene (b-PP) which is a block copolymer of ethylene and propylene. Thus, a small amount of polypropylene (r-PP), which is a random copolymer, may be included in the elastomer composition. The content of the polypropylene (r-PP) in the elastomer composition is preferably more than 0 mass parts and 5 mass parts or less when the content of the styrene-based elastomer is 100 mass parts.

The polymer may be, for example, an amide-based polymer such as an amide-based elastomer or an amide-based resin. Examples of the amide-based polymer include polyamide 6, polyamide 11, polyamide 12, polyamide 66, and polyamide 610.

The polymer may be, for example, an ester-based polymer such as an ester-based elastomer or an ester-based resin. Examples of the ester-based polymer include polyethylene terephthalate and polybutylene terephthalate.

Examples of the urethane-based polymer include polyester-based polyurethane and polyether-based polyurethane.

The characteristics such as mechanical strength can be improved by including a polymer other than the styrene-based thermoplastic elastomers in the elastomer composition. However, inclusion of the other polymer in the elastomer composition may cause deterioration of the characteristics such as mechanical strength, or deterioration of the transparency of the elastomer composition. Accordingly, the proportion of the styrene-based thermoplastic elastomers to the total amount of the polymer included in the elastomer composition of this embodiment is preferably 80 mass % or more. The proportion is more preferably 85 mass % or more, still more preferably 90 mass % or more, particularly preferably 95 mass % or more. It is the most preferable that the polymers included in the elastomer composition be substantially only the styrene-based thermoplastic elastomers.

The proportion of the first styrene-based thermoplastic elastomer (TPS1), the second styrene-based thermoplastic elastomer (TPS2), and the third styrene-based thermoplastic elastomer (TPS3) to the total amount of the plurality of styrene-based thermoplastic elastomers included in the elastomer composition is preferably set so that, for example, a mass ratio [(TPS1+TPS3):TPS2] falls within the range of 99:1 to 40:60.

When the total amount of the plurality of styrene-based thermoplastic elastomers is 100 mass %, the proportion of the first styrene-based thermoplastic elastomer (TPS1) to the plurality of styrene-based thermoplastic elastomers is preferably 30 mass % or more, more preferably 40 mass % or more. The proportion of the first styrene-based thermoplastic elastomer (TPS1) can be 50 mass % or more. This proportion is preferably 99 mass % or less, more preferably 95 mass % or less, still more preferably 90 mass % or less. That is, the proportion of the first styrene-based thermoplastic elastomer (TPS1) to the total amount of the plurality of styrene-based thermoplastic elastomers included in the elastomer composition is preferably 30 mass % or more and 99 mass % or less.

The proportion of the second styrene-based thermoplastic elastomer (TPS2) to the total amount of the plurality of styrene-based thermoplastic elastomers included in the elastomer composition is preferably 1 mass % or more, more preferably 3 mass % or more, still more preferably 5 mass % or more. This proportion is preferably 60 mass % or less, more preferably 55 mass % or less, still more preferably 50 mass % or less. That is, the proportion of the second styrene-based thermoplastic elastomer (TPS2) to the total amount of the plurality of styrene-based thermoplastic elastomers included in the elastomer composition is preferably 1 mass % or more and 60 mass % or less.

The third styrene-based thermoplastic elastomer (TPS3) is preferably included as being replaced with a part of the first styrene-based thermoplastic elastomer (TPS1). The amount of the third styrene-based thermoplastic elastomer (TPS3) is preferably smaller than the first styrene-based thermoplastic elastomer (TPS1). The third styrene-based thermoplastic elastomer (TPS3) is included so that the total amount of the first styrene-based thermoplastic elastomer (TPS1) and the third styrene-based thermoplastic elastomer (TPS3) is preferably 40 mass % or more, more preferably 50 mass % or more. The third styrene-based thermoplastic elastomer (TPS3) is included so that the total amount of the first styrene-based thermoplastic elastomer (TPS1) and the third styrene-based thermoplastic elastomer (TPS3) is 99 mass % or less, more preferably 90 mass % or less. The proportion of the third styrene-based thermoplastic elastomer (TPS3) only is preferably 1 mass % or more, more preferably 5 mass % or more. The proportion of the third styrene-based thermoplastic elastomer (TPS3) only is preferably 40 mass % or less, more preferably 30 mass % or less.

Examples of the plasticizer included in the elastomer composition along with the plurality of styrene-based thermoplastic elastomers include: hydrocarbons such as paraffin oil, paraffin wax, naphthene oil, aromatic oil, polybutadiene, or polybutene; epoxidized oils such as epoxidized soy oil or epoxidized flaxseed oil; esters such as carboxylic acid ester, phosphoric acid ester, or sulfonic acid ester; and higher alcohols such as oleyl alcohol or stearyl alcohol.

The kinetic viscosity at 40° C. of the plasticizer is preferably 50 mm$^2$/s or more, more preferably 60 mm$^2$/s or more, still more preferably 70 mm$^2$/s or more. The kinetic viscosity at 40° C. of the plasticizer is preferably 500 mm$^2$/s or less, more preferably 450 mm$^2$/s or less, still more preferably 420 mm$^2$/s or less. The kinetic viscosity at 40° C. of the plasticizer is preferably 50 mm$^2$/s or more and 500 mm$^2$/s or less.

When the elastomer composition includes a plurality of plasticizers, the plurality of plasticizers is preferably mixed to show the aforementioned kinetic viscosity in a mixture state.

The kinetic viscosity of the plasticizer can be obtained according to JIS K2283 "Crude petroleum and petroleum products—Determination of kinematic viscosity and calculation of viscosity index from kinematic viscosity".

When the total amount of the styrene-based thermoplastic elastomers included in the elastomer composition is 100 mass parts, the content of the plasticizer in the elastomer composition is preferably 50 mass parts or more, more preferably 75 mass parts or more, still more preferably 100 mass parts or more, particularly preferably 120 mass parts or more. The content of the plasticizer is preferably 500 mass parts or less. The content of the plasticizer is more preferably 300 mass parts or less, still more preferably 250 mass parts or less, particularly preferably 230 mass parts or less. The content of the plasticizer is preferably 50 mass parts or more and 500 mass parts or less, more preferably 60 mass parts or more and 400 mass parts or less, still more preferably 70 mass parts or more and 300 mass parts or less, particularly preferably 100 mass parts or more and 250 mass parts or less. The content of the plasticizer can be 120 mass parts or more and 230 mass parts or less.

The plasticizer is preferably paraffin oil since the elastomer composition exhibits excellent transparency. In particular, the plasticizer is preferably paraffin oil having a mass average molecular weight of 500 or more and 2,500 or less. The mass average molecular weight of the paraffin oil is more preferably 1,000 or more, still more preferably 1,300 or more. In the elastomer composition, it is preferable that a first paraffin oil having a mass average molecular weight of 1,300 or more and 2,500 or less and a second paraffin oil having a mass average molecular weight of 500 or more and 1,200 and less be mixed together for use. It is preferable that the first paraffin oil (P1) and the second paraffin oil (P2) be included in the elastomer composition so that the mass ratio (P1:P2) is 1:2 to 2:1.

The mass average molecular weight of the oil can be obtained using GPC in the manner as mentioned below. The column "TSKgel, SuperHM-H (6.0 mm ID×15 cm manufactured by Tohso Corporation)" is used, and THF (tetrahydrofuran) is used as eluent. The measurement is made under the measurement conditions with a sample concentration of 0.02 mass %, a flow rate of 0.6 mL/min, a sample injection amount of 100 μL, and a measurement temperature at 40° C., using an IR detector. The mass average molecular weight of the oil can be obtained as polystyrene-equivalent value based on the calibration curve obtained by the standard polystyrene.

In the elastomer composition, a crosslinking agent for crosslinking the elastomer may be included as needed. As the crosslinking agent, for example, an organic peroxide, a maleimide-based crosslinking agent, a sulfur, phenol-based crosslinking agent, oximes, a polyamine, or the like can be employed. Further, the elastomer may be crosslinked by irradiation of an electron beam or an X-ray.

Examples of the organic peroxide include dicumyl peroxide, di-t-butyl peroxide, 2,5-dimethyl-2,5-di-(t-butylperoxy)hexane, 2,5-dimethyl-2,5-di-(t-butylperoxy)hexane-3, 1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butyl peroxybenzoate, t-butylperoxyisopropyl carbonate, diacetyl peroxide, lauroyl peroxide, and t-butylcumyl peroxide. The elastomer composition may include solely a single crosslinking agent such as one described above, or may include a plurality of crosslinking agents.

In the elastomer composition, an inorganic filler such as clay, talc, or silica may be further included. The inorganic filler included in the elastomer composition may be metal foil, glass flakes, pearl mica, or the like having light reflection properties. The elastomer composition may include solely a single inorganic filler such as one described above, or may include a plurality of inorganic fillers. Since the smooth surfaces of the first cushioning part 51 and the second cushioning part 52 of this embodiment are less likely to cause irregular reflection of light, the light from the outside can easily reach the inorganic filler and the reflected light on the inorganic filler is easily visible by including the inorganic filler having such light reflection properties. That is, the first cushioning part 51 and the second cushioning part 52 of this embodiment are allowed to exhibit excellent appearance by including the light reflective inorganic filler.

The elastomer composition may include an organic filler such as cellulose nanofibers and aramid fibers. Further, the first cushioning part 51 and the second cushioning part 52 of this embodiment can include colorful plastic beads as the organic filler.

In the elastomer composition, one or two or more selected from among, for example, a processing aid, a weather-proof agent, a flame retardant, a pigment, a mold releasing agent, an electrostatic preventing agent, an antimicrobial agent, and a deodorizer.

The first cushioning part 51 and the second cushioning part 52 can be produced using forming molds respectively having shapes corresponding to the overall shapes of these cushioning parts. As a method for forming the elastomer composition into the injection molded article to be served as the first cushioning part 51 or the second cushioning part 52, a general injection molding method can be employed, and a method of injecting a heated and molten elastomer into a cavity of a forming mold can be employed.

Figure 3A:
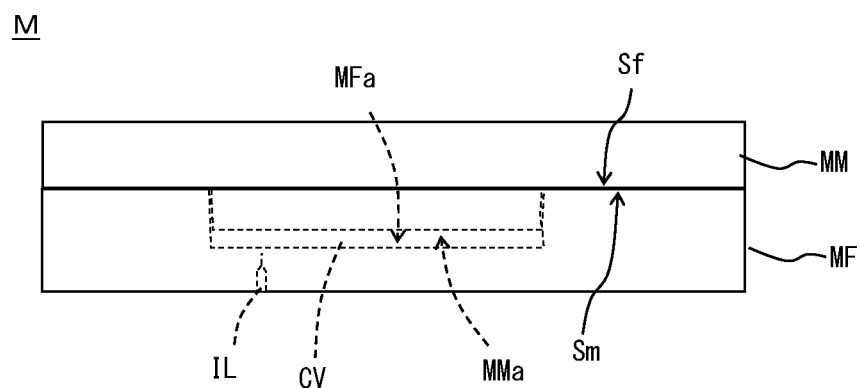
FIG. 3A is a schematic front view of a forming mold for producing a shoe part according to one embodiment.
Figure 3B:
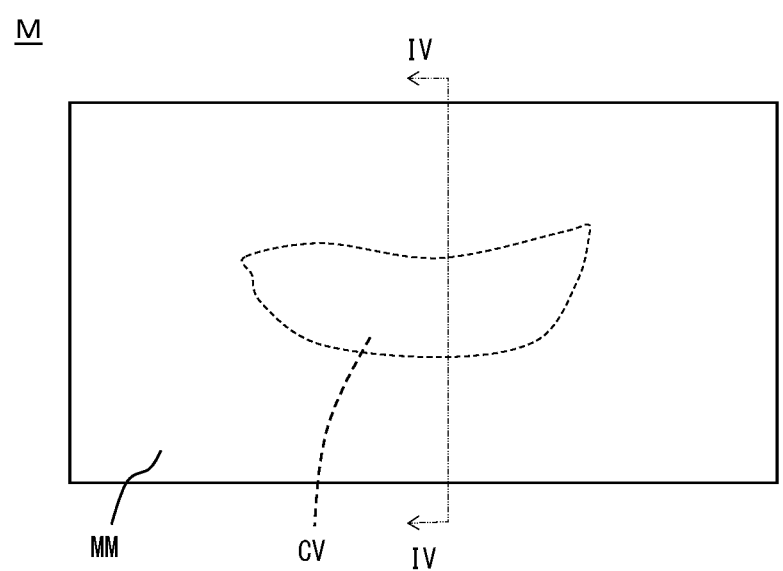
FIG. 3B is a schematic plan view of the forming mold for producing the shoe part according to the one embodiment.
Figure 3C:
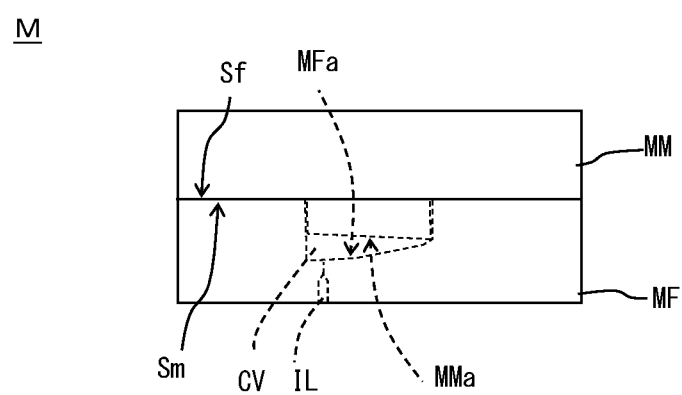
FIG. 3C is a schematic side view of the forming mold for producing the shoe part according to the one embodiment.
Figure 4:
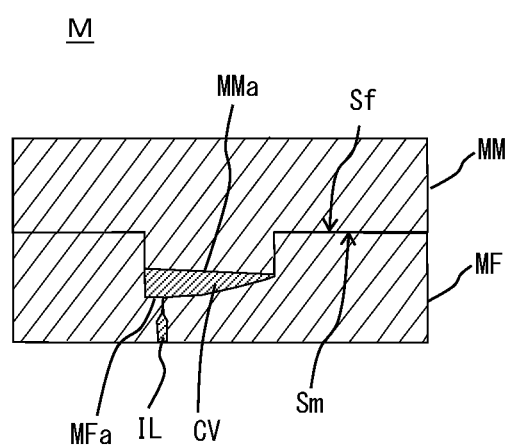
FIG. 4 is a schematic view showing a method for molding a shoe part using the forming mold shown in FIG. 3A to FIG. 3C (i.e., a cross sectional view taken along the line and viewed in the direction of arrows IV-IV thereof in FIG. 3B).

When a shoe part such as the first cushioning part 51 and the second cushioning part 52 is produced by injection molding, a forming mold M as shown in, for example, FIG. 3A, FIG. 3B, and FIG. 3C, is used. The forming mold M shown in the figures is a forming mold used for producing the second cushioning part 52. The forming mold M is composed of a pair of molds respectively having mating surfaces Sf, Sm that contact each other when the mold is closed. The forming mold M has a male mold MM and a female mold MF as the pair of molds. The forming mold M is configured to be able to form a closed cavity CV inside the forming mold by mating the male mold MM with the female mold ME In the male mold MM of this embodiment, a molding surface MMa defining the cavity CV is a smooth surface without being subjected to the mat treatment or the hairline treatment. Also in the female mold MF, a molding surface MFa defining the cavity CV is a smooth surface without being subjected to mat treatment or hairline treatment.

The forming mold M includes an inlet IL for introducing an elastomer composition from an injection molding machine, in which the elastomer composition is molten and kneaded, to the cavity CV. In the injection molding using the forming mold M, the elastomer composition injected from the inlet IL into the cavity CV is filled in the entire cavity CV while being cooled by the molding surfaces (MMa, MFa). At this time, the injection molded article produced in this embodiment is unlikely to form fine wrinkles on the surface because the elastomer composition has the aforementioned melting characteristics (the complex viscosity and the loss tangent), thereby smoothly flowing along the molding surfaces. Therefore, the surface of the injection molded article produced in this embodiment can faithfully reflect the surface characteristics of the molding surfaces. That is, the injection molded article in this embodiment can be produced to have a smooth surface.

The faithful reflection of the surface characteristics of the molding surface is also realized in the case where the molding surface is subjected to hairline treatment or mat treatment.

The description of this embodiment is merely an example. This embodiment is described by taking, for example, the shoe provided with a plurality of midsoles including the first midsole and the second midsole layered in the vertical direction, but the midsole provided in the shoe sole of the present invention may be composed of one layer or three or more layers. Further, this embodiment is described by taking, for example, the shoe that has the cushioning parts sandwiched between the first midsole and the second midsole, but the cushioning parts may be provided between the midsole and the outsole or between the midsole and the upper. Moreover, the cushioning parts may be arranged to be embedded in recesses formed in the midsole.

This embodiment is described by taking, for example, the case where the injection molded article is used as the cushioning part, but the injection molded article of this embodiment may be used for a shoe part for other purposes than the cushioning purpose. Further, this embodiment is described by taking, for example, the case where the injection molded article is used as the shoe part, but the intended use of the injection molded article of this embodiment is not limited to the shoe part. That is, the injection molded article and the shoe according to the present invention are not limited to the aforementioned exemplification.

EXAMPLES

Next, the present invention will be described in more detail with reference to test examples, but not limited thereto.

First Styrene-Based Thermoplastic Elastomer

Two different first styrene-based thermoplastic elastomers having a mass average molecular weight of 300,000 or more were prepared as follows:
TPS1-a: SEEPS having a mass average molecular weight of 300,000 and a styrene content of 30 mass %; and
TPS1-b: SEEPS having a mass average molecular weight of 400,000 and a styrene content of 30 mass %.

Second Styrene-Based Thermoplastic Elastomer

As a block polymer including a polyethylene block exhibiting crystallinity, the following was prepared:
TPS2: SEBC having a mass average molecular weight of 62,000, MFR (230° C., 2.16 kg)=5.5 g/10 min, and a styrene content of 20 mass %.

Third Styrene-Based Thermoplastic Elastomer

As the third styrene-based thermoplastic elastomer having a mass average molecular weight of 200,000 or less, the followings were prepared:
TPS3-a: SEEPS having a mass average molecular weight of 100,000 and a styrene content of 30 mass %;
TPS3-b: SEBS having a mass average molecular weight of 83,000 and a styrene content of 30 mass %; and
TPS3-c: SEBS having a mass average molecular weight of 116,000 and a styrene content of 18 mass %.

Plasticizer

As a plasticizer, two different paraffin oils were prepared as follows:
P1: Paraffin oil having a mass average molecular weight of approximately 900 and a kinetic viscosity at 40° C. of approximately 91 mm$^2$/s; and
P2: Paraffin oil having a mass average molecular weight of approximately 1,400 and a kinetic viscosity at 40° C. of approximately 409 mm$^2$/s.

Preparation of Elastomer Composition

An elastomer composition according to each of Reference Example 1, Examples 1 to 6, and Comparative Examples 1 to 11 was prepared by melting and kneading the aforementioned styrene-based thermoplastic elastomers and plasticizers with blending amounts described later in Table 1.

Evaluation 1: Heat Melting Characteristics

A complex viscosity and a loss tangent between 100° C. and 200° C. of each of the elastomer compositions was measured by performing dynamic viscoelasticity measurement. From the obtained results, the maximum value ($\eta_{max}$) of the complex viscosity in the frequency range of from 1 Hz to 50 Hz and the maximum value (tan $\delta_{max}$) of the loss tangent in the frequency range of from 1 Hz to 50 Hz were calculated.

Evaluation 2: Surface Characteristics 1-Haze

A forming mold having a flat plate-shaped cavity having a thickness of 4 mm was prepared. Each of the heated and molten elastomer compositions was injected into the cavity of the forming mold to produce a plate-shaped injection molded article having a thickness of 4 mm. The haze (Haze blank) of each of the injection molded articles was measured. Subsequently, two pieces of a polyethylene terephthalate film (having a thickness of 50 μm) having a sufficiently smooth surface and excellent transparency were prepared, followed by sandwiching each of the injection molded articles between the two pieces of the polyethylene terephthalate film to be subjected to hot pressing, thereby producing plate-shaped samples each having a thickness of 4 mm in which the polyethylene terephthalate film was adhered to the surface of the injection molded article, while the surface of the injection molded article was smoothened by the polyethylene terephthalate film. The haze (Haze cure) of each of the plate-shaped samples was measured. The difference (ΔHaze=Haze blank−Haze cure) between the haze (Haze blank) before hot pressing and the haze (Haze cure) after hot pressing was calculated to evaluate the degree of improvement in surface smoothness by hot pressing. That is, the injection molded article showing a low degree of improvement effect by hot pressing was originally in good conditions, that is, had a smooth surface without fine wrinkles on the surface. Therefore, the surface characteristics of each of the injection molded articles was evaluated based on the difference between the hazes.

Evaluation 3: Surface Characteristics 2-Surface Roughness

The surface roughness of the injection molded article was evaluated according to the non-contact method based on ISO-25178. The surface of the injection molded article was observed using a scanning electron microscope with a magnification of 100 times to capture a three dimensional image. The visual field at this time was 1,280 μm×960 μm. A profile curve of the surface of the injection molded article was obtained from the three dimensional image, followed by removing swells with a 0.25 mm Gaussian filter, to evaluate the surface roughness (i.e., the arithmetic mean value Ra). Five profile curves were collected from five points in the three dimensional image. The arithmetic mean value was determined by averaging the obtained five measured values. Also, a standard deviation (SD) of the arithmetic mean value was calculated from the five measured values.

Each of the evaluation results is also shown in Table 1.

TABLE 1

| | Grade | $M_w$ (×10$^3$) | MFR (g/10 min) | Ref. Ex. 1 | C. Ex. 1 | Ex. 1 | Ex. 2 | C. Ex. 2 | Ex. 3 | Ex. 4 | C. Ex. 3 | Ex. 5 |
|---|---|---|---|---|---|---|---|---|---|---|---|---|
| TPS | TPS1-a(SEEPS) | 300 | no flow | | 100 | 80 | 60 | | | | | |
| | TPS1-b(SEEPS) | 400 | no flow | | | | | 100 | 80 | 60 | 100 | 80 |
| | TPS2 (SEBC) | 62 | 5.5 | | | 20 | 40 | | 20 | 40 | | 20 |
| | TPS3-a(SEEPS) | 100 | <0.1 | 100 | | | | | | | | |
| | TPS3-b(SEBS) | 83 | 5.0 | | | | | | | | | |
| | TPS3-c(SEBS) | 116 | 4.5 | | | | | | | | | |
| Plasticizer | P1 (Paraffin oil) | 0.9 | — | 300 | 300 | 300 | 300 | 300 | 300 | 300 | | |
| | P2 (Paraffin oil) | 1.4 | — | | | | | | | | 300 | 300 |
| | Total | | | 400 | 400 | 400 | 400 | 400 | 400 | 400 | 400 | 400 |
| Fusion characteristics | $\eta^*_{Max, 1\text{-}50\,Hz}$ Pa·s | | 100° C. | 2720 | 6559 | 2918 | 1116 | 6926 | 3133 | 857 | 7400 | 4633 |
| | | | 120° C. | 568.8 | 6326 | 1643 | 527 | 6618 | 1828 | 422 | 7086 | 3399 |
| | | | 140° C. | 106 | 6039 | 1033 | 372 | 6583 | 1253 | 259 | 6806 | 2776 |
| | | | 160° C. | 13.29 | 5844 | 779 | 352 | 6326 | 1053 | 197 | 6558 | 2877 |

TABLE 1-continued

| | | | | | | | | | | | | |
|---|---|---|---|---|---|---|---|---|---|---|---|---|
| | | 180° C. | | 3.246 | 5763 | 654 | 312 | 6123 | 997 | 192 | 6417 | 3400 |
| | | 200° C. | | 1.327 | 4070 | 446 | 191 | 3790 | 1005 | 215 | 5271 | 3641 |
| | tanδ$_{Max, 1-50 Hz}$ | 100° C. | | 1.07 | 0.08 | 0.67 | 0.99 | 0.08 | 0.55 | 1.16 | 0.10 | 0.32 |
| | Pa · s | 120° C. | | 1.44 | 0.10 | 0.80 | 1.23 | 0.09 | 0.66 | 1.39 | 0.11 | 0.39 |
| | | 140° C. | | 11.1 | 0.12 | 0.89 | 1.21 | 0.10 | 0.72 | 1.52 | 0.12 | 0.41 |
| | | 160° C. | | 233 | 0.12 | 1.01 | 1.07 | 0.11 | 0.75 | 1.55 | 0.12 | 0.40 |
| | | 180° C. | | >1000 | 0.18 | 0.88 | 0.95 | 0.17 | 0.71 | 1.42 | 0.14 | 0.32 |
| | | 200° C. | | >1000 | 0.41 | 0.91 | 1.03 | 0.37 | 0.60 | 1.17 | 0.16 | 0.23 |
| Transparency (Surface smoothness) | Haze blank | | % | 9 | 96 | 89 | 88 | 96 | 92 | 90 | 95 | 94 |
| | Haze cure | | % | 9 | 26 | 28 | 30 | 28 | 33 | 38 | 34 | 37 |
| | ⊿ Haze | | % | 0 | 70 | 61 | 58 | 68 | 59 | 53 | 61 | 57 |
| Surface roughness | Arithmetic mean roughness Ra | | μm | 0.21 | 13.65 | 6.28 | 4.57 | 14.54 | 7.88 | 4.05 | 15.6 | 5.39 |
| | SD | | μm | 0.01 | 1.93 | 0.94 | 0.92 | 4.32 | 1.69 | 0.17 | 3.29 | 0.6 |

| | | Grade | M$_w$ (×10^3) | MFR (g/10 min) | C. Ex. 6 | Ex. 4 | Ex. 5 | Ex. 6 | C. Ex. 7 | C. Ex. 8 | C. Ex. 9 | C. Ex. 10 | C. Ex. 11 |
|---|---|---|---|---|---|---|---|---|---|---|---|---|---|
| TPS | | TPS1-a(SEEPS) | 300 | no flow | | | 80 | 60 | | | | | |
| | | TPS1-b(SEEPS) | 400 | no flow | 60 | | | | 80 | 60 | 80 | 60 | 80 | 60 |
| | | TPS2 (SEBC) | 62 | 5.5 | 40 | | | | | | | | |
| | | TPS3-a(SEEPS) | 100 | <0.1 | | | 20 | 40 | 20 | 40 | | | |
| | | TPS3-b(SEBS) | 83 | 5.0 | | | | | | | 20 | 40 | |
| | | TPS3-c(SEBS) | 116 | 4.5 | | | | | | | | | 20 | 40 |
| Plasticizer | | P1 (Paraffin oil) | 0.9 | — | | 300 | 300 | 300 | 300 | 300 | 300 | 300 | 300 |
| | | P2 (Paraffin oil) | 1.4 | — | 300 | | | | | | | | |
| | | Total | | | 400 | 400 | 400 | 400 | 400 | 400 | 400 | 400 | 400 |
| Fusion characteristics | η*$_{Max, 1-50 Hz}$ Pa · s | 100° C. | | | 1269 | 6548 | 5637 | 6935 | 6298 | 5223 | 2436 | 4494 | 1154 |
| | | 120° C. | | | 622 | 4685 | 3414 | 5148 | 3663 | 4304 | 1361 | 3597 | 561 |
| | | 140° C. | | | 348 | 4576 | 2737 | 4290 | 2563 | 3794 | 982 | 3113 | 516 |
| | | 160° C. | | | 267 | 4499 | 2596 | 4226 | 2232 | 3763 | 891 | 3124 | 373 |
| | | 180° C. | | | 212 | 4143 | 2276 | 4068 | 2158 | 2561 | 846 | 2259 | 324 |
| | | 200° C. | | | 174 | 2848 | 1469 | 3430 | 1775 | 2195 | 693 | 2144 | 286 |
| | tanδ$_{Max, 1-50 Hz}$ Pa · s | 100° C. | | | 0.86 | 0.24 | 0.34 | 0.21 | 0.33 | 0.17 | 0.41 | 0.21 | 0.66 |
| | | 120° C. | | | 1.08 | 0.27 | 0.38 | 0.25 | 0.38 | 0.21 | 0.49 | 0.25 | 0.78 |
| | | 140° C. | | | 1.30 | 0.25 | 0.41 | 0.26 | 0.42 | 0.20 | 0.54 | 0.25 | 0.95 |
| | | 160° C. | | | 1.38 | 0.20 | 0.35 | 0.25 | 0.40 | 0.19 | 0.52 | 0.26 | 0.89 |
| | | 180° C. | | | 1.43 | 0.19 | 0.25 | 0.18 | 0.29 | 0.18 | 0.48 | 0.29 | 0.85 |
| | | 200° C. | | | 1.39 | 0.40 | 0.53 | 0.15 | 0.24 | 0.15 | 0.63 | 0.19 | 0.49 |
| Transparency (Surface smoothness) | Haze blank | | % | | 94 | 98 | 97 | 97 | 95 | 95 | 90 | 94 | 89 |
| | Haze cure | | % | | 39 | 13 | 12 | 12 | 11 | 14 | 12 | 19 | 16 |
| | ⊿ Haze | | % | | 55 | 85 | 85 | 85 | 84 | 81 | 78 | 75 | 73 |
| Surface roughness | Arithmetic mean roughness Ra | | μm | | 2.66 | 12.3 | 8.84 | 14.62 | 10.8 | 12.06 | 5.61 | 8.76 | 6.79 |
| | SD | | μm | | 0.3 | 1.04 | 1.51 | 3.93 | 1.97 | 1.24 | 1.32 | 0.75 | 1.06 |

In the results shown in Table 1 above, when the elastomer compositions each having a block polymer including a polyethylene block exhibiting crystallinity are compared with the elastomer compositions each having no such a block polymer, it is found that addition of the block polymer having the polyethylene block exhibiting crystallinity as shown in Table 2 causes the elastomer composition to have a good fluidity.

TABLE 2

| | | Grade | M$_w$ (×10^3) | MFR (g/10 min) | Ref. Ex. 1 | C. Ex. 1 | Ex. 1 | Ex. 2 | C. Ex. 2 | Ex. 3 | Ex. 4 | C. Ex. 3 | Ex. 5 | Ex. 6 |
|---|---|---|---|---|---|---|---|---|---|---|---|---|---|---|
| TPS | | TPS1-a(SEEPS) | 300 | no flow | | 100 | 80 | 60 | | | | | | |
| | | TPS1-b(SEEPS) | 400 | no flow | | | | | 100 | 80 | 60 | 100 | 80 | 60 |
| | | TPS2 (SEBC) | 62 | 5.5 | | | 20 | 40 | | 20 | 40 | | 20 | 40 |
| | | TPS3-a(SEEPS) | 100 | <0.1 | 100 | | | | | | | | | |
| | | TPS3-b(SEBS) | 83 | 5.0 | | | | | | | | | | |
| | | TPS3-c(SEBS) | 116 | 4.5 | | | | | | | | | | |

TABLE 2-continued

| | | $M_w$ (×10^3) | MFR (g/10 min) | Ref. Ex. 1 | C. Ex. 1 | Ex. 1 | Ex. 2 | C. Ex. 2 | Ex. 3 | Ex. 4 | C. Ex. 3 | Ex. 5 | Ex. 6 |
|---|---|---|---|---|---|---|---|---|---|---|---|---|---|
| | Grade | | | | | | | | | | | | |
| Plasticizer | P1 (Paraffin oil) | 0.9 | — | 300 | 300 | 300 | 300 | 300 | 300 | 300 | | | |
| | P2 (Paraffin oil) | 1.4 | — | | | | | | | | 300 | 300 | 300 |
| | Total | | | 400 | 400 | 400 | 400 | 400 | 400 | 400 | 400 | 400 | 400 |
| Fusion characteristics | $\eta^*_{Max, 1\text{-}50\,Hz}$ Pa·s | | 100° C. | 2720 | 6559 | 2918 | 1116 | 6926 | 3133 | 857 | 7400 | 4633 | 1269 |
| | | | 120° C. | 569 | 6326 | 1643 | 527 | 6618 | 1828 | 422 | 7086 | 3399 | 622 |
| | | | 140° C. | 106 | 6039 | 1033 | 372 | 6583 | 1253 | 259 | 6806 | 2776 | 348 |
| | | | 160° C. | 13.29 | 5844 | 779 | 352 | 6326 | 1053 | 197 | 6558 | 2877 | 267 |
| | | | 180° C. | 3.246 | 5763 | 654 | 312 | 6123 | 997 | 192 | 6417 | 3400 | 212 |
| | | | 200° C. | 1.327 | 4070 | 446 | 191 | 3790 | 1005 | 215 | 5271 | 3641 | 174 |
| | $\tan\delta_{Max, 1\text{-}50\,Hz}$ Pa·s | | 100° C. | 1.07 | 0.08 | 0.67 | 0.99 | 0.08 | 0.55 | 1.16 | 0.10 | 0.32 | 0.86 |
| | | | 120° C. | 1.44 | 0.10 | 0.80 | 1.23 | 0.09 | 0.66 | 1.39 | 0.11 | 0.39 | 1.08 |
| | | | 140° C. | 11.1 | 0.12 | 0.89 | 1.21 | 0.10 | 0.72 | 1.52 | 0.12 | 0.41 | 1.30 |
| | | | 160° C. | 233 | 0.12 | 1.01 | 1.07 | 0.11 | 0.75 | 1.55 | 0.12 | 0.40 | 1.38 |
| | | | 180° C. | >1000 | 0.18 | 0.88 | 0.95 | 0.17 | 0.71 | 1.42 | 0.14 | 0.32 | 1.43 |
| | | | 200° C. | >1000 | 0.41 | 0.91 | 1.03 | 0.37 | 0.60 | 1.17 | 0.16 | 0.23 | 1.39 |
| Transparency (Surface smoothness) | Haze blank | % | | 9 | 96 | 89 | 88 | 96 | 92 | 90 | 95 | 94 | 94 |
| | Haze cure | % | | 9 | 26 | 28 | 30 | 28 | 33 | 38 | 34 | 37 | 39 |
| | Δ Haze | % | | 0 | 70 | 61 | 58 | 68 | 59 | 53 | 61 | 57 | 55 |
| Surface roughness | Arithmetic mean roughness Ra | μm | | 0.21 | 13.65 | 6.28 | 4.57 | 14.54 | 7.88 | 4.05 | 15.6 | 5.39 | 2.66 |
| | SD | μm | | 0.01 | 1.93 | 0.94 | 0.92 | 4.32 | 1.69 | 0.17 | 3.29 | 0.6 | 0.3 |

In the results shown in Table 1 above, when the elastomer compositions, in which SEEPS (TPS3-a) or SEBS (TPS3-b, TPS3-c) having a molecular amount being as low as the block polymer is included in place of the block polymer including the polyethylene block exhibiting crystallinity, are compared with the elastomer compositions, each including the block polymer having the polyethylene block exhibiting crystallinity, it is found that addition of the block polymer having the polyethylene block exhibiting crystallinity as shown in Tables 3 and 4 causes the elastomer composition to have a good fluidity.

TABLE 3

| | Grade | $M_w$ (×10^3) | MFR (g/10 min) | C. Ex. 1 | Ex. 1 | C. Ex. 4 | Ex. 2 | C. Ex. 5 | Ex. 3 | C. Ex. 6 | Ex. 4 | C. Ex. 7 |
|---|---|---|---|---|---|---|---|---|---|---|---|---|
| TPS | TPS1-a(SEEPS) | 300 | no flow | 100 | 80 | 80 | 60 | 60 | | | | |
| | TPS1-b(SEEPS) | 400 | no flow | | | | | | 80 | 80 | 60 | 60 |
| | TPS2 (SEBC) | 62 | 5.5 | | 20 | | 40 | | 20 | | 40 | |
| | TPS3-a(SEEPS) | 100 | <0.1 | | | 20 | | 40 | | 20 | | 40 |
| | TPS3-b(SEBS) | 83 | 5.0 | | | | | | | | | |
| | TPS3-c(SEBS) | 116 | 4.5 | | | | | | | | | |
| Plasticizer | P1 (Paraffin oil) | 0.9 | — | 300 | 300 | 300 | 300 | 300 | 300 | 300 | 300 | 300 |
| | P2 (Paraffin oil) | 1.4 | — | | | | | | | | | |
| | Total | | | 400 | 400 | 400 | 400 | 400 | 400 | 400 | 400 | 400 |
| Fusion characteristics | $\eta^*_{Max, 1\text{-}50\,Hz}$ Pa·s | | 100° C. | 6559 | 2918 | 6548 | 1116 | 5637 | 3133 | 6935 | 857 | 6298 |
| | | | 120° C. | 6326 | 1643 | 4685 | 527 | 3414 | 1828 | 5148 | 422 | 3663 |
| | | | 140° C. | 6039 | 1033 | 4576 | 372 | 2737 | 1253 | 4290 | 259 | 2563 |
| | | | 160° C. | 5844 | 779 | 4499 | 352 | 2596 | 1053 | 4226 | 197 | 2232 |
| | | | 180° C. | 5763 | 654 | 4143 | 312 | 2276 | 997 | 4068 | 192 | 2158 |
| | | | 200° C. | 4070 | 446 | 2848 | 191 | 1469 | 1005 | 3430 | 215 | 1775 |
| | $\tan\delta_{Max, 1\text{-}50\,Hz}$ Pa·s | | 100° C. | 0.0841 | 0.67 | 0.24 | 0.99 | 0.34 | 0.55 | 0.21 | 1.16 | 0.33 |
| | | | 120° C. | 0.0960 | 0.80 | 0.27 | 1.23 | 0.38 | 0.66 | 0.25 | 1.39 | 0.38 |
| | | | 140° C. | 0.120 | 0.89 | 0.25 | 1.21 | 0.41 | 0.72 | 0.26 | 1.52 | 0.42 |
| | | | 160° C. | 0.122 | 1.01 | 0.20 | 1.07 | 0.35 | 0.75 | 0.25 | 1.55 | 0.40 |
| | | | 180° C. | 0.185 | 0.88 | 0.19 | 0.95 | 0.25 | 0.71 | 0.18 | 1.42 | 0.29 |
| | | | 200° C. | 0.413 | 0.91 | 0.40 | 1.03 | 0.53 | 0.60 | 0.15 | 1.17 | 0.24 |

TABLE 3-continued

| | Grade | $M_w$ (×10^3) | MFR (g/10 min) | C. Ex. 1 | Ex. 1 | C. Ex. 4 | Ex. 2 | C. Ex. 5 | Ex. 3 | C. Ex. 6 | Ex. 4 | C. Ex. 7 |
|---|---|---|---|---|---|---|---|---|---|---|---|---|
| Transparency (Surface smoothness) | Haze blank | | % | 96 | 89 | 98 | 88 | 97 | 92 | 97 | 90 | 95 |
| | Haze cure | | % | 26 | 28 | 13 | 30 | 12 | 33 | 12 | 38 | 11 |
| | ⊿ Haze | | % | 70 | 61 | 85 | 58 | 85 | 59 | 85 | 53 | 84 |
| Surface roughness | Arithmetic mean roughness Ra | | μm | 13.65 | 6.28 | 12.3 | 4.57 | 8.84 | 7.88 | 14.62 | 4.05 | 10.8 |
| | SD | | μm | 1.93 | 0.94 | 1.04 | 0.92 | 1.51 | 1.69 | 3.93 | 0.17 | 1.97 |

TABLE 4

| | Grade | $M_w$ (×10^3) | MFR (g/10 min) | C. Ex. 2 | Ex. 3 | C. Ex. 8 | C. Ex. 10 | Ex. 4 | C. Ex. 9 | C. Ex. 11 |
|---|---|---|---|---|---|---|---|---|---|---|
| TPS | TPS1-a(SEEPS) | 300 | no flow | | | | | | | |
| | TPS1-b(SEEPS) | 400 | no flow | 100 | 80 | 80 | 80 | 60 | 60 | 60 |
| | TPS2 (SEBC) | 62 | 5.5 | | 20 | | | 40 | | |
| | TPS3-a(SEEPS) | 100 | <0.1 | | | | | | | |
| | TPS3-b(SEBS) | 83 | 5.0 | | | 20 | | | 40 | |
| | TPS3-c(SEBS) | 116 | 4.5 | | | | 20 | | | 40 |
| Plasticizer | P1 (Paraffin oil) | 0.9 | — | 300 | 300 | 300 | 300 | 300 | 300 | 300 |
| | P2 (Paraffin oil) | 1.4 | — | | | | | | | |
| | Total | | | 400 | 400 | 400 | 400 | 400 | 400 | 400 |
| Fusion characteristics | $\eta^*_{Max, 1-50 Hz}$ Pa·s | 100° C. | | 6926 | 3133 | 5223 | 4494 | 857 | 2436 | 1154 |
| | | 120° C. | | 6618 | 1828 | 4304 | 3597 | 422 | 1361 | 561 |
| | | 140° C. | | 6583 | 1253 | 3794 | 3113 | 259 | 982 | 516 |
| | | 160° C. | | 6326 | 1053 | 3763 | 3124 | 197 | 891 | 373 |
| | | 180° C. | | 6123 | 997 | 2561 | 2259 | 192 | 846 | 324 |
| | | 200° C. | | 3790 | 1005 | 2195 | 2144 | 215 | 693 | 286 |
| | $\tan\delta_{Max, 1-50 Hz}$ Pa·s | 100° C. | | 0.08 | 0.55 | 0.17 | 0.21 | 1.16 | 0.41 | 0.66 |
| | | 120° C. | | 0.09 | 0.66 | 0.21 | 0.25 | 1.39 | 0.49 | 0.78 |
| | | 140° C. | | 0.10 | 0.72 | 0.20 | 0.25 | 1.52 | 0.54 | 0.95 |
| | | 160° C. | | 0.11 | 0.75 | 0.19 | 0.26 | 1.55 | 0.52 | 0.89 |
| | | 180° C. | | 0.17 | 0.71 | 0.18 | 0.29 | 1.42 | 0.48 | 0.85 |
| | | 200° C. | | 0.37 | 0.60 | 0.15 | 0.19 | 1.17 | 0.63 | 0.49 |
| Transparency (Surface smoothness) | Haze blank | | % | 96 | 92 | 95 | 94 | 90 | 90 | 89 |
| | Haze cure | | % | 28 | 33 | 14 | 19 | 38 | 12 | 16 |
| | ⊿ Haze | | % | 68 | 59 | 81 | 75 | 53 | 78 | 73 |
| Surface roughness | Arithmetic mean roughness Ra | | μm | 14.54 | 7.88 | 12.06 | 8.76 | 4.05 | 5.61 | 6.79 |
| | SD | | μm | 4.32 | 1.69 | 1.24 | 0.75 | 0.17 | 1.32 | 1.06 |

Also from the above results, it is found that addition of the second styrene-based thermoplastic elastomer that is a block polymer having the polyethylene block exhibiting crystallinity to the first styrene-based thermoplastic elastomer (TPS1-a, TPS1-b) having a mass average molecular weight of 300,000 causes the elastomer composition to have a good fluidity.

Next, the evaluation results of the elastomer compositions (Examples 7 to 12) including three styrene-based thermoplastic elastomers are shown below. The methods of preparation and evaluation of the elastomer compositions are the same as, for example, in Example 1 described above. Examples 7 to 9 are such that part of the first styrene-based thermoplastic elastomer in Comparative Example 5 (i.e., the styrene-based thermoplastic elastomer having a mass average molecular weight of 300,000 or more) is replaced with the second styrene-based thermoplastic elastomer (i.e., the block polymer having a polyethylene block exhibiting crystallinity). Examples 10 to 12 are such that the first styrene-based thermoplastic elastomer in Comparative Example 7 (i.e., the styrene-based thermoplastic elastomer having a mass average molecular weight of 300,000 or more) is replaced with the second styrene-based thermoplastic elastomer (i.e., the block polymer having a polyethylene block exhibiting crystallinity).

TABLE 5

| | | $M_w$ (×10^3) | MFR (g/10 min) | C. Ex. 5 | Ex. 7 | Ex. 8 | Ex. 9 | C. Ex. 7 | Ex. 10 | Ex. 11 | Ex. 12 |
|---|---|---|---|---|---|---|---|---|---|---|---|
| TPS | TPS1-a(SEEPS) | 300 | no flow | 60 | 50 | 40 | 20 | | | | |
| | TPS1-b(SEEPS) | 400 | no flow | | | | | 60 | 50 | 40 | 20 |
| | TPS2 (SEBC) | 62 | 5.5 | | 10 | 20 | 40 | | 10 | 20 | 40 |
| | TPS3-a(SEEPS) | 100 | <0.1 | 40 | 40 | 40 | 40 | 40 | 40 | 40 | 40 |
| | TPS3-b(SEBS) | 83 | 5.0 | | | | | | | | |
| | TPS3-c(SEBS) | 116 | 4.5 | | | | | | | | |
| Plasticizer | P1 (Parafin oil) | 0.9 | — | 300 | 300 | 300 | 300 | 300 | 300 | 300 | 300 |
| | P2 (Parafin oil) | 1.4 | — | | | | | | | | |
| | Total | | | 400 | 400 | 400 | 400 | 400 | 400 | 400 | 400 |
| Fusion characteristics | $\eta^*_{Max, 1-50 Hz}$ Pa·s | | 100° C. | 5637 | 4340 | 3078 | 1304 | 6298 | 4705 | 3200 | 1532 |
| | | | 120° C. | 3414 | 2489 | 1567 | 448 | 3663 | 2370 | 1454 | 402 |
| | | | 140° C. | 2737 | 2032 | 1175 | 169 | 2563 | 1459 | 718 | 109 |
| | | | 160° C. | 2596 | 1792 | 984 | 64 | 2232 | 1112 | 429 | 27 |
| | | | 180° C. | 2276 | 1469 | 829 | 33 | 2158 | 1017 | 309 | 10 |
| | | | 200° C. | 1469 | 792 | 430 | 12 | 1775 | 851 | 217 | 7 |
| | $\tan\delta_{Max, 1-50 Hz}$ Pa·s | | 100° C. | 0.34 | 0.39 | 0.43 | 0.83 | 0.33 | 0.41 | 0.49 | 0.90 |
| | | | 120° C. | 0.38 | 0.43 | 0.51 | 1.09 | 0.38 | 0.49 | 0.61 | 1.38 |
| | | | 140° C. | 0.41 | 0.49 | 0.67 | 1.55 | 0.42 | 0.57 | 0.77 | 3.07 |
| | | | 160° C. | 0.35 | 0.52 | 0.72 | 4.31 | 0.40 | 0.66 | 0.98 | 4.67 |
| | | | 180° C. | 0.25 | 0.43 | 0.64 | 70.00 | 0.29 | 0.64 | 1.08 | >1000 |
| | | | 200° C. | 0.53 | 0.74 | 0.78 | >1000 | 0.24 | 0.52 | 1.36 | >1000 |
| Transparency (Surface smoothness) | Haze blank | | % | 97 | 86 | 74 | 65 | 95 | 86 | 77 | 66 |
| | Haze cure | | % | 12 | 16 | 18 | 35 | 11 | 18 | 21 | 36 |
| | ⊿ Haze | | % | 85 | 70 | 56 | 29 | 84 | 68 | 55 | 30 |
| Surface roughness | Arithmeic mean roughness Ra | | μm | 8.84 | 7.93 | 4.19 | 1.19 | 10.8 | 8.89 | 4.79 | 2.00 |
| | SD | | μm | 1.51 | 1.33 | 1.01 | 0.27 | 1.97 | 2.05 | 1.60 | 0.70 |

Also from the results shown in Table 5 above, it is found that addition of the second styrene-based thermoplastic elastomer causes the elastomer composition to have a good fluidity.

Each of Example 8, Example 9, Example 11, and Example 12 among Examples 7 to 12 above is such that part of the first styrene-based thermoplastic elastomer in Examples 1 to 4 (i.e., the styrene-based thermoplastic elastomer having a mass average molecular weight of 300,000 or more) is replaced with the third styrene-based thermoplastic elastomer (i.e., the styrene-based thermoplastic elastomer having a mass average molecular weight of 200,000 or less). When these elastomer compositions are compared with each other, it is found that inclusion of the third styrene-based thermoplastic elastomer is more advantageous in terms of obtaining an injection molded article excellent in surface smoothness.

TABLE 6

| | | $M_w$ (×10^3) | MFR (g/10 min) | Ex. 1 | Ex. 8 | Ex. 2 | Ex. 9 | Ex. 3 | Ex. 11 | Ex. 4 | Ex. 12 |
|---|---|---|---|---|---|---|---|---|---|---|---|
| TPS | TPS1-a(SEEPS) | 300 | no flow | 80 | 40 | 60 | 20 | | | | |
| | TPS1-b(SEEPS) | 400 | no flow | | | | | 80 | 40 | 60 | 20 |
| | TPS2 (SEBC) | 62 | 5.5 | 20 | 20 | 40 | 40 | 20 | 20 | 40 | 40 |
| | TPS3-a(SEEPS) | 100 | <0.1 | | 40 | | 40 | | 40 | | 40 |
| | TPS3-b(SEBS) | 83 | 5.0 | | | | | | | | |
| | TPS3-c(SEBS) | 116 | 4.5 | | | | | | | | |
| Plasticizer | P1 (Paraffin oil) | 0.9 | — | 300 | 300 | 300 | 300 | 300 | 300 | 300 | 300 |
| | P2 (Paraffin oil) | 1.4 | — | | | | | | | | |
| | Total | | | 400 | 400 | 400 | 400 | 400 | 400 | 400 | 400 |
| Fusion characteristics | $\eta^*_{Max, 1-50 Hz}$ Pa·s | | 100° C. | 2918 | 3078 | 1116 | 1304 | 3133 | 3200 | 857 | 1532 |
| | | | 120° C. | 1643 | 1567 | 527 | 448 | 1828 | 1454 | 422 | 402 |
| | | | 140° C. | 1033 | 1175 | 372 | 169 | 1253 | 718 | 259 | 109 |
| | | | 160° C. | 779 | 984 | 352 | 64 | 1053 | 429 | 197 | 27 |
| | | | 180° C. | 654 | 829 | 312 | 33 | 997 | 309 | 192 | 10 |
| | | | 200° C. | 446 | 430 | 191 | 12 | 1005 | 217 | 215 | 7 |

TABLE 6-continued

|  |  | Grade | $M_w$ (×10^3) | MFR (g/10 min) | Ex. 1 | Ex. 8 | Ex. 2 | Ex. 9 | Ex. 3 | Ex. 11 | Ex. 4 | Ex. 12 |
|---|---|---|---|---|---|---|---|---|---|---|---|---|
|  |  | $\tan\delta_{Max,\ 1\text{-}50\ Hz}$ Pa·s | | 100° C. | 0.67 | 0.43 | 0.99 | 0.83 | 0.55 | 0.49 | 1.16 | 0.90 |
|  |  | | | 120° C. | 0.80 | 0.51 | 1.23 | 1.09 | 0.66 | 0.61 | 1.39 | 1.38 |
|  |  | | | 140° C. | 0.89 | 0.67 | 1.21 | 1.55 | 0.72 | 0.77 | 1.52 | 3.07 |
|  |  | | | 160° C. | 1.01 | 0.72 | 1.07 | 4.31 | 0.75 | 0.98 | 1.55 | 4.67 |
|  |  | | | 180° C. | 0.88 | 0.64 | 0.95 | 70.00 | 0.71 | 1.08 | 1.42 | >1000 |
|  |  | | | 200° C. | 0.91 | 0.78 | 1.03 | >1000 | 0.60 | 1.36 | 1.17 | >1000 |
| Transparency (Surface smoothness) | Haze blank | | | % | 89 | 74 | 88 | 65 | 92 | 77 | 90 | 66 |
|  | Haze cure | | | % | 28 | 18 | 30 | 35 | 33 | 21 | 38 | 36 |
|  | Δ Haze | | | % | 61 | 56 | 58 | 29 | 59 | 55 | 53 | 30 |
| Surface roughness | Arithmeic mean roughness Ra | | | μm | 6.28 | 4.19 | 4.57 | 1.19 | 7.88 | 4.79 | 4.05 | 2.00 |
|  | SD | | | μm | 0.94 | 1.01 | 0.92 | 0.27 | 1.69 | 1.60 | 0.17 | 0.70 |

Lastly, the evaluation results of the elastomer compositions (Examples 13 to 16) produced by changing the content of the plasticizer are shown in Table 7 below.

TABLE 7

|  |  | Grade | $M_w$ (×10^3) | MFR (g/10 min) | Ex. 13 | Ex. 14 | Ex. 15 | Ex. 16 | Ex. 8 |
|---|---|---|---|---|---|---|---|---|---|
| TPS | TPS1-a(SEEPS) | | 300 | no flow | 40 | 40 | 40 | 40 | 40 |
|  | TPS1-b(SEEPS) | | 400 | no flow | | | | | |
|  | TPS2 (SEBC) | | 62 | 5.5 | 20 | 20 | 20 | 20 | 20 |
|  | TPS3-a(SEEPS) | | 100 | <0.1 | 40 | 40 | 40 | 40 | 40 |
|  | TPS3-b(SEBS) | | 83 | 5.0 | | | | | |
|  | TPS3-c(SEBS) | | 116 | 4.5 | | | | | |
| Plasticizer | P1 (Paraffin oil) | | 0.9 | — | 100 | 150 | 200 | 250 | 300 |
|  | P2 (Paraffin oil) | | 1.4 | — | | | | | |
|  | Total | | | | 200 | 250 | 300 | 350 | 400 |
| Fusion characteristics | $\eta^*_{Max,\ 1\text{-}50\ Hz}$ Pa·s | | | 100° C. | 23698 | 12229 | 8031 | 4657 | 3078 |
|  | | | | 120° C. | 14914 | 6925 | 3995 | 2262 | 1567 |
|  | | | | 140° C. | 9681 | 4047 | 2410 | 1587 | 1175 |
|  | | | | 160° C. | 6266 | 2897 | 2020 | 1403 | 984 |
|  | | | | 180° C. | 4864 | 2595 | 1840 | 1236 | 829 |
|  | | | | 200° C. | 4335 | 2406 | 1521 | 895 | 430 |
|  | $\tan\delta_{Max,\ 1\text{-}50\ Hz}$ Pa·s | | | 100° C. | 0.26 | 0.33 | 0.40 | 0.44 | 0.43 |
|  | | | | 120° C. | 0.41 | 0.52 | 0.56 | 0.54 | 0.51 |
|  | | | | 140° C. | 0.52 | 0.56 | 0.59 | 0.61 | 0.67 |
|  | | | | 160° C. | 0.54 | 0.60 | 0.65 | 0.71 | 0.72 |
|  | | | | 180° C. | 0.56 | 0.64 | 0.67 | 0.63 | 0.64 |
|  | | | | 200° C. | 0.59 | 0.56 | 0.53 | 0.48 | 0.78 |
| Surface roughness | Arithmetic mean roughness Ra | | | μm | 15.19 | 11.84 | 8.28 | 5.31 | 4.19 |
|  | SD | | | μm | 0.44 | 2.45 | 1.35 | 0.71 | 1.01 |
| Hardness | ASKER-C | | | deg. | 58 | 48 | 40 | 33 | 28 |
| Tensile strength | $T_B$ | | | MPa | 3.4 | 2.8 | 2.2 | 1.6 | 1.3 |
| Tear strength | $T_S$ | | | N/mm | 18.4 | 13.9 | 10.8 | 8.4 | 7.5 |

The above results reveal that the mechanical characteristics of the elastomer composition (i.e., the injection molded article) can be easily adjusted to a desired value by adjusting the amount of the plasticizer.

REFERENCE SIGNS LIST

1: Shoe
2: Upper
3: Midsole
4: Outsole
5: Cushioning part
11: Forefoot portion
12: Midfoot portion
13: Rear foot portion
31: First midsole
32: Second midsole
51: First cushioning part
52: Second cushioning part
CV: Cavity
M: Forming mold MF: Female mold
MFa: Molding surface
MM: Male mold
MMa: Molding surface

The invention claimed is:

1. An injection molded article composed of an elastomer composition comprising a plurality of styrene-based thermoplastic elastomers and a plasticizer, wherein
the plurality of styrene-based thermoplastic elastomers comprise a first styrene-based thermoplastic elastomer and a second styrene-based thermoplastic elastomer,
the first styrene-based thermoplastic elastomer has a mass average molecular weight of 300,000 or more,
the first styrene-based thermoplastic elastomer is a block polymer that comprises a soft segment and two hard segments with the soft segment aligned between the two hard segments,
the second styrene-based thermoplastic elastomer is a block polymer that comprises a polyethylene block exhibiting crystallinity,
the plurality of styrene-based thermoplastic elastomers further comprise a third styrene-based thermoplastic elastomer, and
the third styrene-based thermoplastic elastomer has a mass average molecular weight of 200,000 or less.

2. The injection molded article according to claim 1, wherein
a mass proportion of the second styrene-based thermoplastic elastomer in the elastomer composition is from 1 mass % to 10 mass %.

3. The injection molded article according to claim 2, wherein
a mass ratio of the first styrene-based thermoplastic elastomer to the second styrene-based thermoplastic elastomer in the elastomer composition (the first styrene-based thermoplastic elastomer: the second styrene-based thermoplastic elastomer) is 100:25 to 100:250.

4. The injection molded article according to claim 2, wherein
the second styrene-based thermoplastic elastomer comprises crystals of polyethylene in a proportion of from 4 mass % to 12 mass %.

5. The injection molded article according to claim 2, wherein
the second styrene-based thermoplastic elastomer is a styrene-ethylene/butylene-ethylene copolymer.

6. The injection molded article according to claim 5, wherein
a styrene content in the styrene-ethylene/butylene-ethylene copolymer is from 10 mass % to 30 mass %.

7. The injection molded article according to claim 1, wherein
a mass ratio of the first styrene-based thermoplastic elastomer to the second styrene-based thermoplastic elastomer in the elastomer composition (the first styrene-based thermoplastic elastomer: the second styrene-based thermoplastic elastomer) is 100:25 to 100:250.

8. The injection molded article according to claim 7, wherein
the second styrene-based thermoplastic elastomer comprises crystals of polyethylene in a proportion of from 4 mass % to 12 mass %.

9. The injection molded article according to claim 7, wherein
the second styrene-based thermoplastic elastomer is a styrene-ethylene/butylene-ethylene copolymer.

10. The injection molded article according to claim 9, wherein
a styrene content in the styrene-ethylene/butylene-ethylene copolymer is from 10 mass % to 30 mass %.

11. The injection molded article according to claim 1, wherein
the second styrene-based thermoplastic elastomer comprises crystals of polyethylene in a proportion of from 4 mass % to 12 mass %.

12. The injection molded article according to claim 11, wherein
the second styrene-based thermoplastic elastomer is a styrene-ethylene/butylene-ethylene copolymer.

13. The injection molded article according to claim 12, wherein
a styrene content in the styrene-ethylene/butylene-ethylene copolymer is from 10 mass % to 30 mass %.

14. The injection molded article according to claim 1, wherein
the second styrene-based thermoplastic elastomer is a styrene-ethylene/butylene-ethylene copolymer.

15. The injection molded article according to claim 14, wherein
a styrene content in the styrene-ethylene/butylene-ethylene copolymer is from 10 mass % to 30 mass %.

16. The injection molded article according to claim 1, wherein
a content of the plasticizer in the elastomer composition is from 100 mass % to 500 mass % when a total content of the plurality of styrene-based thermoplastic elastomers is 100 mass %.

17. The injection molded article according to claim 1, wherein
the first styrene-based thermoplastic elastomer is a triblock polymer.

18. A shoe composed of a plurality of shoe parts, wherein at least one of the plurality of shoe parts is the injection molded article according to claim 1.

* * * * *